US009504106B2

(12) United States Patent
Melanson et al.

(10) Patent No.: US 9,504,106 B2
(45) Date of Patent: *Nov. 22, 2016

(54) COMPENSATING FOR A REVERSE RECOVERY TIME PERIOD OF A BIPOLAR JUNCTION TRANSISTOR (BJT) IN SWITCH-MODE OPERATION OF A LIGHT-EMITTING DIODE (LED)-BASED BULB

(71) Applicant: Cirrus Logic, Inc., Austin, TX (US)

(72) Inventors: John L. Melanson, Austin, TX (US); Thirumalai Rengachari, Austin, TX (US); Siddharth Maru, Austin, TX (US); Ramin Zanbaghi, Austin, TX (US); Firas Azrai, Austin, TX (US); Rahul Singh, Austin, TX (US)

(73) Assignee: CIRRUS LOGIC, INC., Austin, TX (US)

( * ) Notice: Subject to any disclaimer, the term of this patent is extended or adjusted under 35 U.S.C. 154(b) by 30 days.

This patent is subject to a terminal disclaimer.

(21) Appl. No.: 14/341,984

(22) Filed: Jul. 28, 2014

(65) Prior Publication Data

US 2015/0028768 A1 Jan. 29, 2015

Related U.S. Application Data

(60) Provisional application No. 61/859,638, filed on Jul. 29, 2013.

(51) Int. Cl.
*H05B 37/02* (2006.01)
*H05B 33/08* (2006.01)
*H02M 3/156* (2006.01)

(52) U.S. Cl.
CPC ......... *H05B 33/0815* (2013.01); *H02M 3/156* (2013.01); *H05B 33/0845* (2013.01); *H05B 37/02* (2013.01)

(58) Field of Classification Search
CPC .............................. H05B 37/02; H02M 3/335
USPC ............ 315/209 R, 224–225, 291, 294, 297, 315/307; 363/21
See application file for complete search history.

(56) References Cited

U.S. PATENT DOCUMENTS 3,660,751 A 5/1972 Bullinga
3,790,878 A 2/1974 Brokaw
(Continued)

FOREIGN PATENT DOCUMENTS

EP 0536535 A1 4/1993
EP 0636889 A1 2/1995
(Continued)

OTHER PUBLICATIONS

International Search Report and Written Opinion mailed Sep. 18, 2014, during examination of PCT/US2014/038490, cited references previously disclosed on Sep. 29, 2014.
(Continued)

*Primary Examiner* — Tung X Le
(74) *Attorney, Agent, or Firm* — Norton Rose Fulbright US LLP

(57) ABSTRACT

A turn-off transition time period, also referred to as a reverse recovery time period, may be compensated for by a controller of a power stage including a bipolar junction transistor (BJT). The reverse recovery time period may be measured in one switching cycle and a subsequent switching cycle may include compensations based on the measured reverse recovery time period. That is the switching on and off of the BJT may be compensated to obtain a desired average output current to a load. When the reverse recovery time period is known, an error in the peak current obtained due to the reverse recovery time period may be calculated. The calculated error may be used to offset the target peak current for controlling the switching of the BJT to begin a turn-off transition of the BJT earlier in a switching cycle and thus reduce error in peak current at the BJT.

22 Claims, 15 Drawing Sheets

(56) References Cited

U.S. PATENT DOCUMENTS

| | | |
|---|---|---|
| 4,322,785 A | 3/1982 | Walker |
| 4,339,671 A | 7/1982 | Park et al. |
| 4,342,956 A | 8/1982 | Archer |
| 4,399,500 A | 8/1983 | Clarke et al. |
| 4,410,810 A | 10/1983 | Christen |
| 4,493,017 A | 1/1985 | Kammiller et al. |
| 4,585,986 A | 4/1986 | Dyer |
| 4,629,971 A | 12/1986 | Kirk |
| 4,675,547 A | 6/1987 | Eichenwald |
| 4,677,366 A | 6/1987 | Wilkinson et al. |
| 4,683,529 A | 7/1987 | Bucher, II |
| 4,737,658 A | 4/1988 | Kronmuller et al. |
| 4,739,462 A | 4/1988 | Farnsworth et al. |
| 4,937,728 A | 6/1990 | Leonardi |
| 4,940,929 A | 7/1990 | Williams |
| 4,970,635 A | 11/1990 | Shekhawat et al. |
| 4,977,366 A | 12/1990 | Powell |
| 5,001,620 A | 3/1991 | Smith |
| 5,003,454 A | 3/1991 | Bruning |
| 5,055,746 A | 10/1991 | Hu et al. |
| 5,109,185 A | 4/1992 | Ball |
| 5,173,643 A | 12/1992 | Sullivan et al. |
| 5,264,780 A | 11/1993 | Bruer et al. |
| 5,278,490 A | 1/1994 | Smedley |
| 5,383,109 A | 1/1995 | Maksimovic et al. |
| 5,424,665 A | 6/1995 | Sueri et al. |
| 5,424,932 A | 6/1995 | Inou et al. |
| 5,430,635 A | 7/1995 | Liu |
| 5,479,333 A | 12/1995 | McCambridge et al. |
| 5,481,178 A | 1/1996 | Wilcox et al. |
| 5,486,781 A | 1/1996 | Im |
| 5,565,761 A | 10/1996 | Hwang |
| 5,638,265 A | 6/1997 | Gabor |
| 5,691,890 A | 11/1997 | Hyde |
| 5,747,977 A | 5/1998 | Hwang |
| 5,757,635 A | 5/1998 | Seong |
| 5,764,039 A | 6/1998 | Choi et al. |
| 5,783,909 A | 7/1998 | Hochstein |
| 5,798,635 A | 8/1998 | Hwang et al. |
| 5,808,453 A | 9/1998 | Lee et al. |
| 5,874,725 A | 2/1999 | Yamaguchi |
| 5,960,207 A | 9/1999 | Brown |
| 5,994,885 A | 11/1999 | Wilcox et al. |
| 6,043,633 A | 3/2000 | Lev et al. |
| 6,084,450 A | 7/2000 | Smith et al. |
| 6,091,233 A | 7/2000 | Hwang et al. |
| 6,160,724 A | 12/2000 | Hemena et al. |
| 6,229,292 B1 | 5/2001 | Redl et al. |
| 6,259,614 B1 | 7/2001 | Ribarich et al. |
| 6,300,723 B1 | 10/2001 | Wang et al. |
| 6,304,066 B1 | 10/2001 | Wilcox et al. |
| 6,304,473 B1 | 10/2001 | Telefus et al. |
| 6,343,026 B1 | 1/2002 | Perry |
| 6,356,040 B1 | 3/2002 | Preis et al. |
| 6,445,600 B2 | 9/2002 | Ben-Yaakov |
| 6,469,484 B2 | 10/2002 | L'Hermite et al. |
| 6,510,995 B2 | 1/2003 | Muthu et al. |
| 6,531,854 B2 | 3/2003 | Hwang |
| 6,580,258 B2 | 6/2003 | Wilcox et al. |
| 6,583,550 B2 | 6/2003 | Iwasa et al. |
| 6,628,106 B1 | 9/2003 | Batarseh et al. |
| 6,657,417 B1 | 12/2003 | Hwang |
| 6,661,182 B2 | 12/2003 | Sridharan |
| 6,696,803 B2 | 2/2004 | Tao et al. |
| 6,724,174 B1 | 4/2004 | Esteves et al. |
| 6,758,199 B2 | 7/2004 | Masters et al. |
| 6,768,655 B1 | 7/2004 | Yang et al. |
| 6,781,351 B2 | 8/2004 | Mednik et al. |
| 6,839,247 B1 | 1/2005 | Yang et al. |
| 6,882,552 B2 | 4/2005 | Telefus et al. |
| 6,894,471 B2 | 5/2005 | Corva et al. |
| 6,933,706 B2 | 8/2005 | Shih |
| 6,940,733 B2 | 9/2005 | Schie et al. |
| 6,944,034 B1 | 9/2005 | Shteynberg et al. |
| 6,956,750 B1 | 10/2005 | Eason et al. |
| 6,975,523 B2 | 12/2005 | Kim et al. |
| 6,980,446 B2 | 12/2005 | Simada et al. |
| 7,042,161 B1 | 5/2006 | Konopka |
| 7,072,191 B2 | 7/2006 | Nakao et al. |
| 7,099,163 B1 | 8/2006 | Ying |
| 7,161,816 B2 | 1/2007 | Shteynberg et al. |
| 7,221,130 B2 | 5/2007 | Ribeiro et al. |
| 7,224,206 B2 | 5/2007 | Pappalardo et al. |
| 7,233,135 B2 | 6/2007 | Noma et al. |
| 7,266,001 B1 | 9/2007 | Notohamiprodjo et al. |
| 7,292,013 B1 | 11/2007 | Chen et al. |
| 7,295,452 B1 | 11/2007 | Liu |
| 7,411,379 B2 | 8/2008 | Chu et al. |
| 7,414,371 B1 | 8/2008 | Choi et al. |
| 7,439,810 B2 | 10/2008 | Manicone et al. |
| 7,449,841 B2 | 11/2008 | Ball |
| 7,554,473 B2 | 6/2009 | Melanson |
| 7,567,091 B2 | 7/2009 | Farnworth et al. |
| 7,606,532 B2 | 10/2009 | Wuidart |
| 7,667,986 B2 | 2/2010 | Artusi et al. |
| 7,684,223 B2 | 3/2010 | Wei |
| 7,719,246 B2 | 5/2010 | Melanson |
| 7,719,248 B1 | 5/2010 | Melanson |
| 7,746,043 B2 | 6/2010 | Melanson |
| 7,804,480 B2 | 9/2010 | Jeon et al. |
| 7,834,553 B2 | 11/2010 | Hunt et al. |
| 7,859,488 B2 | 12/2010 | Kimura |
| 7,872,883 B1 | 1/2011 | Elbanhawy |
| 7,894,216 B2 | 2/2011 | Melanson |
| 8,008,898 B2 | 8/2011 | Melanson et al. |
| 8,169,806 B2 | 5/2012 | Sims et al. |
| 8,193,717 B2 | 6/2012 | Leiderman |
| 8,222,772 B1 | 7/2012 | Vinciarelli |
| 8,242,764 B2 | 8/2012 | Shimizu et al. |
| 8,248,145 B2 | 8/2012 | Melanson |
| 8,369,109 B2 | 2/2013 | Niedermeier et al. |
| 8,441,220 B2 | 5/2013 | Imura |
| 8,536,799 B1 | 9/2013 | Grisamore et al. |
| 8,610,364 B2 | 12/2013 | Melanson et al. |
| 8,823,283 B2 * | 9/2014 | Kesterson ............. 315/186 |
| 2002/0082056 A1 | 6/2002 | Mandai et al. |
| 2003/0090252 A1 | 5/2003 | Hazucha |
| 2003/0111969 A1 | 6/2003 | Konishi et al. |
| 2003/0160576 A1 | 8/2003 | Suzuki |
| 2003/0174520 A1 | 9/2003 | Bimbaud |
| 2003/0214821 A1 | 11/2003 | Giannopoulos et al. |
| 2003/0223255 A1 | 12/2003 | Ben-Yaakov et al. |
| 2004/0046683 A1 | 3/2004 | Mitamura et al. |
| 2004/0196672 A1 | 10/2004 | Amei |
| 2005/0057237 A1 | 3/2005 | Clavel |
| 2005/0207190 A1 | 9/2005 | Gritter |
| 2005/0231183 A1 | 10/2005 | Li et al. |
| 2005/0270813 A1 | 12/2005 | Zhang et al. |
| 2005/0275354 A1 | 12/2005 | Hausman et al. |
| 2006/0013026 A1 | 1/2006 | Frank et al. |
| 2006/0022648 A1 | 2/2006 | Ben-Yaakov et al. |
| 2006/0214603 A1 | 9/2006 | Oh et al. |
| 2007/0103949 A1 | 5/2007 | Tsuruya |
| 2007/0182347 A1 | 8/2007 | Shteynberg et al. |
| 2008/0018261 A1 | 1/2008 | Kastner |
| 2008/0043504 A1 | 2/2008 | Ye et al. |
| 2008/0062584 A1 | 3/2008 | Freitag et al. |
| 2008/0062586 A1 | 3/2008 | Apfel |
| 2008/0117656 A1 | 5/2008 | Clarkin |
| 2008/0130336 A1 | 6/2008 | Taguchi |
| 2008/0175029 A1 | 7/2008 | Jung et al. |
| 2008/0259655 A1 | 10/2008 | Wei et al. |
| 2008/0278132 A1 | 11/2008 | Kesterson et al. |
| 2008/0310194 A1 | 12/2008 | Huang et al. |
| 2009/0040796 A1 | 2/2009 | Lalithambika et al. |
| 2009/0059632 A1 | 3/2009 | Li et al. |
| 2009/0067204 A1 | 3/2009 | Ye et al. |
| 2009/0108677 A1 | 4/2009 | Walter et al. |
| 2009/0184665 A1 | 7/2009 | Ferro |
| 2009/0295300 A1 | 12/2009 | King |
| 2010/0128501 A1 | 5/2010 | Huang et al. |
| 2010/0202165 A1 | 8/2010 | Zheng et al. |
| 2010/0238689 A1 | 9/2010 | Fei et al. |
| 2010/0244793 A1 | 9/2010 | Caldwell |

(56) References Cited

U.S. PATENT DOCUMENTS

| | | |
|---|---|---|
| 2011/0110132 A1 | 5/2011 | Rausch et al. |
| 2011/0199793 A1 | 8/2011 | Kuang et al. |
| 2011/0276938 A1 | 11/2011 | Perry et al. |
| 2011/0291583 A1 | 12/2011 | Shen |
| 2011/0298442 A1 | 12/2011 | Waltisperger et al. |
| 2011/0309760 A1 | 12/2011 | Beland et al. |
| 2012/0062131 A1 | 3/2012 | Choi et al. |
| 2012/0146540 A1 | 6/2012 | Khayat et al. |
| 2012/0182003 A1 | 7/2012 | Flaibani et al. |
| 2012/0187997 A1 | 7/2012 | Liao et al. |
| 2012/0248998 A1 | 10/2012 | Yoshinaga |
| 2012/0286686 A1* | 11/2012 | Watanabe .......... H05B 33/0815 315/224 |
| 2012/0286843 A1 | 11/2012 | Kurokawa |
| 2012/0320640 A1 | 12/2012 | Baurle et al. |
| 2013/0088902 A1 | 4/2013 | Dunipace |
| 2013/0099694 A1* | 4/2013 | Naruo ................ H05B 33/0824 315/224 |
| 2013/0107595 A1 | 5/2013 | Gautier et al. |
| 2013/0181635 A1 | 7/2013 | Ling |
| 2013/0279209 A1* | 10/2013 | Zheng ................ H02M 3/33507 363/21.12 |
| 2014/0218978 A1 | 8/2014 | Heuken et al. |

FOREIGN PATENT DOCUMENTS

| | | |
|---|---|---|
| EP | 1213823 A2 | 6/2002 |
| EP | 1289107 A2 | 3/2003 |
| EP | 1962263 A2 | 8/2008 |
| EP | 2232949 A2 | 9/2010 |
| EP | 2257124 A1 | 12/2010 |
| JP | 2008053181 A | 3/2008 |
| WO | 01/84697 A2 | 11/2001 |
| WO | 2004051834 A1 | 6/2004 |
| WO | 20060013557 A2 | 2/2006 |
| WO | 2006/022107 A1 | 3/2006 |
| WO | 2007016373 A2 | 2/2007 |
| WO | 2008004008 A2 | 1/2008 |
| WO | 20080152838 A1 | 12/2008 |
| WO | 2010011971 A1 | 1/2010 |
| WO | 2010065598 A2 | 6/2010 |
| WO | 2011008635 A1 | 1/2011 |

OTHER PUBLICATIONS

International Search Report and Written Opinion mailed Sep. 16, 2014, during examination of PCT/US2014/038507, cited references previously disclosed on Sep. 29, 2014.

Prodic, et al, Dead-Zone Digital Controller for Improved Dynamic Response of Power Factor Preregulators, Applied Power Electronics Conference and Exposition, 2003, vol. 1, pp. 382-388, Boulder CA, USA.

Philips Semiconductors, 90W Resonant SMPS with TEA 1610 Swing Chip, Application Note AN99011, Sep. 14, 1999, pp. 1-28, The Netherlands.

Fairchild Semiconductor, Power Factor Correction Controller FAN7527B, Aug. 16, 2003, pp. 1-12, San Jose, CA, USA.

On Semiconductor, Power Factor Controller for Compact and Robust, Continuous Conduction Mode Pre-Converters, NCP1654, Mar. 2007, Rev. PO, pp. 1-10, Denver, CO, USA.

Fairchild Semiconductor, Simple Ballast Controller, KA7541, Rev. 1.0.3, Sep. 27, 2001, pp. 1-14, San Jose, CA, USA.

Fairchild Semiconductor, Power Factor Controller, ML4812, Rev. 1.0.4, May 31, 2001, pp. 1-18, San Jose, CA, USA.

Prodic, et al, Digital Controller for High-Frequency Rectifiers with Power Factor Correction Suitable for On-Chip Implementation, Power Conversion Conference—Nagoya, 2007. PCC '07, Apr. 2-5, 2007, pp. 1527-1531, Toronto, Canada.

Freescale Semiconductor, Dimmable Light Ballast with Power Factor Correction, Designer Reference Manual, DRM067, Rev. 1, Dec. 2005, M68HC08 Microcontrollers, pp. 1-72, Chandler, AZ, USA.

Freescale Semiconductor, Design of Indirect Power Factor Correction Using 56F800/E, Freescale Semiconductor Application Note, AN1965, Rev. 1, Jul. 2005, pp. 1-20, Chandler, AZ, USA.

Freescale Semiconductor, Implementing PFC Average Current Mode Control using the MC9S12E128, Application Note AN3052, Addendum to Reference Design Manual DRM064, Rev. 0, Nov. 2005, pp. 1-8, Chandler, AZ, USA.

Hirota, et al, Analysis of Single Switch Delta-Sigma Modulated Pulse Space Modulation PFC Converter Effectively Using Switching Power Device, Power Electronics Specialists Conference, 2002. pesc 02. 2002 IEEE 33rd Annual, vol. 2, pp. 682-686, Hyogo Japan.

Madigan, et al, Integrated High-Quality Rectifier-Regulators, Industrial Electronics, IEEE Transactions, vol. 46, Issue 4, pp. 749-758, Aug. 1999, Cary, NC, USA.

Renesas, Renesas Technology Releases Industry's First Critical-Conduction-Mode Power Factor Correction Control IC Implementing Interleaved Operations, R2A20112, pp. 1-4, Dec. 18, 2006, Tokyo, Japan.

Renesas, PFC Control IC R2A20111 Evaluation Board, Application Note R2A20111 EVB, all pages, Feb. 2007, Rev. 1.0, pp. 1-39, Tokyo, Japan.

Miwa, et al, High Efficiency Power Factor Correction Using Interleaving Techniques, Applied Power Electronics Conference and Exposition, 1992. APEC '92. Conference Proceedings 1992., Seventh Annual, Feb. 23-27, 1992, pp. 557-568, MIT, Cambridge, MA, USA.

Noon, Jim, High Performance Power Factor Preregulator UC3855A!B, Texas Instruments Application Report, SLUA146A, May 1996—Revised Apr. 2004, pp. 1-35, Dallas TX, USA.

NXP Semiconductors, TEA1750, GreenChip III SMPS Control IC Product Data Sheet, Rev.01, Apr. 6, 2007, pp. 1-29, Eindhoven, The Netherlands.

Turchi, Joel, Power Factor Correction Stages Operating in Critical Conduction Mode, ON Semiconductor, Application Note AND8123/D, Sep. 2003-Rev. 1 , pp. 1-20, Denver, CO, USA.

ON Semiconductor, Greenline Compact Power Factor Controller: Innovative Circuit for Cost Effective Solutions, MC33260, Semiconductor Components Industries, Sep. 2005—Rev. 9, pp. 1-22, Denver, CO, USA.

ON Semiconductor, Enhanced, High Voltage and Efficient Standby Mode, Power Factor Controller, NCP1605, Feb. 2007, Rev. 1, pp. 1-32, Denver, CO, USA.

ON Semiconductor, Cost Effective Power Factor Controller, NCP1606, Mar. 2007, Rev. 3, pp. 1-22, Denver, CO, USA.

Renesas, Power Factor Correction Controller IC, HA16174P/FP, Rev. 1.0, Jan. 6, 2006, pp. 1-38, Tokyo, Japan.

Seidel, et al, A Practical Comparison Among High-Power-Factor Electronic Ballasts with Similar Ideas, IEEE Transactions on Industry Applications, vol. 41, No. 6, Nov./Dec. 2005, pp. 1574-1583, Santa Maria, Brazil.

STMicroelectronics, Electronic Ballast with PFC using L6574 and L6561. Application Note AN993, May 2004, pp. 1-20, Geneva, Switzerland.

STMicroelectronics, Advanced Transition-Mode PFC Controller L6563 and L6563A, Mar. 2007, pp. 1-40, Geneva, Switzerland.

Su, et al, "Ultra Fast Fixed-Frequency Hysteretic Buck Converter with Maximum Charging Current Control and Adaptive Delay Compensation for DVS Applications", IEEE Journal of Solid-Slate Circuits, vol. 43, No. 4, Apr. 2008, pp. 815-822, Hong Kong University of Science and Technology, Hong Kong, China.

Wong, et al, "Steady State Analysis of Hysteretic Control Buck Converters", 2008 13th International Power Electronics and Motion Control Conference (EPE-PEMC 2008), pp. 400-404, 2008, National Semiconductor Corporation, Power Management Design Center, Hong Kong, China.

Zhao, et al, Steady-State and Dynamic Analysis of a Buck Converter Using a Hysteretic PWM Control, 2004 35th Annual IEEE Power Electronics Specialists Conference, pp. 3654-3658, Department of Electrical & Electronic Engineering, Oita University, 2004, Oita, Japan.

Texas Instruments, UCC281019, 8-Pin Continuous Conduction Mode (CCM) PFC Controller, SLU828B, Revised Apr. 2009, pp. 1-48, Dallas, Texas, USA.

(56) References Cited

OTHER PUBLICATIONS

International Search Report, PCT/US2012/069942, European Patent Office, Jul. 21, 2014, pp. 1-5.
Written Opinion, PCT/US2012/069942, European Patent Office, Jul. 21, 2014, pp. 1-8.
International Search Report, PCT/US2014/021921, European Patent Office, Jun. 23, 2014, pp. 1-3.
Written Opinion, PCT/US2014/021921, European Patent Office, Jun. 23, 2014, pp. 1-5.
Severns, A New Improved and Simplified Proportional Base Drive Circuit, Proceedings of PowerCon 6, May 1979.
Ivanovic, Zelimir, "A low consumption proportional base drive circuit design for switching transistors", Proceedings of The Fifth International PCI '82 Conference: Sep. 28-30, 1982, Geneva, Switzerland.
Bell, David, "Designing optimal base drive for high voltage switching transistors", Proceeding of PowerCon7, 1980.
Marcelo Godoy Simões, "Power Bipolar Transistors", Chapter 5, Academic Press 2001, pp. 63-74.
Varga, L.D. and Losic, N.A., "Design of a high-performance floating power BJT driver with proportional base drive," Industry Applications Society Annual Meeting, 1989., Conference Record of the Oct. 1-5, 1989, IEEE, vol. I, pp. I186, 1189.
Skanadore, W.R., "Toward an understanding and optimal utilization of third-generation bipolar switching transistors", 1982 IEEE.
IC datasheet STR-S6707 through STR-S6709 by Sanken, copyright 1994, Allegro MicroSystems, Inc.
Avant et al., "Analysis of magnetic proportional drive circuits for bipolar junction transistors" PESC 1985, pp. 375-381.
Maksimovic, et al, Impact of Digital Control in Power Electronics, International Symposium on Power Semiconductor Devices and ICS, 2004, pp. 2-22, Boulder, Colorado, USA.
Fairchild Semiconductor, Ballast Control IC, FAN 7711, Rev. 1.0.3, 2007, pp. 1-23, San Jose, California, USA.
Yao, Gang et al, Soft Switching Circuit for Interleaved Boost Converters, IEEE Transactions on Power Electronics, vol. 22, No. 1, Jan. 2007, pp. 1-8, Hangzhou China.
STMicroelectronics, Transition Mode PFC Controller, Datasheet L6562, Rev. 8, Nov. 2005, pp. 1-16, Geneva, Switzerland.
Zhang, Wanfeng et al, A New Duty Cycle Control Strategy for Power Factor Correction and FPGA Implementation, IEEE Transactions on Power Electronics, vol. 21, No. 6, Nov. 2006, pp. 1-10, Kingston, Ontario, Canada.
STMicroelectronics, Power Factor Connector L6561, Rev 16, Jun. 2004, pp. 1-13, Geneva, Switzerland.
Texas Instruments, Avoiding Audible Noise at Light Loads When Using Leading Edge Triggered PFC Converters, Application Report SLUA309A, Mar. 2004—Revised Sep. 2004, pp. 1-4, Dallas, Texas, USA.
Texas Instruments, Startup Current Transient of the Leading Edge Triggered PFC Controllers, Application Report SLUA321, Jul. 2004, pp. 1-4, Dallas, Texas, USA.
Texas Instruments, Current Sense Transformer Evaluation UCC3817, Application Report SLUA308, Feb. 2004, pp. 1-3, Dallas, Texas, USA.
Texas Instruments, BiCMOS Power Factor Preregulator Evaluation Board UCC3817, User's Guide, SLUU077C, Sep. 2000—Revised Nov. 2002, pp. 1-10, Dallas, Texas, USA.
Texas Instruments, Interleaving Continuous Conduction Mode PFC Controller, UCC28070, SLUS794C, Nov. 2007—Revised Jun. 2009, pp. 1-45, Dallas, Texas, USA.
Texas Instruments, 350-W Two-Phase Interleaved PFC Pre-regulator Design Review, Application Report SLUA369B, Feb. 2005—Revised Mar. 2007, pp. 1-22, Dallas, Texas, USA.
Texas Instruments, Average Current Mode Controlled Power Factor Correction Converter using TMS320LF2407A, Application Report SPRA902A, Jul. 2005, pp. 1-15, Dallas, Texas, USA.
Texas Instruments, Transition Mode PFC Controller, UCC28050, UCC28051, UCC38050, UCC38051, Application Note SLUS515D, Sep. 2002—Revised Jul. 2005, pp. 1-28, Dallas, Texas, USA.

Unitrode, High Power-Factor Preregulator, UC1852, UC2852, UC3852, Feb. 5, 2007, pp. 1-8, Merrimack, Maine, USA.
Unitrode, Optimizing Performance in UC3854 Power Factor Correction Applications, Design Note ON 39E, 1999, pp. 1-6, Merrimack, Maine, USA.
ON Semiconductor Four Key Steps to Design a Continuous Conduction Mode PFC Stage Using the NCP1653, Application Note AND8184/D, Nov. 2004, pp. 1-8, Phoenix, AZ, USA.
Unitrode, BiCMOS Power Factor Preregulator, Texas Instruments, UCC2817, UCC2818, UCC3817, UCC3818, SLUS3951, Feb. 2000—Revised Feb. 2006, pp. 1-25, Dallas, Texas, USA.
Unitrode, UC3854AIB and UC3855A!B Provide Power Limiting with Sinusoidal Input Current for PFC Front Ends, SLUA196A, Design Note DN-66, Jun. 1995—Revised Nov. 2001, pp. 1-6, Merrimack, Maine, USA.
Unitrode, Programmable Output Power Factor Preregulator, UCC2819, UCC3819, SLUS482B, Apr. 2001—Revised Dec. 2004, pp. 1-16, Merrimack, Maine, USA.
http://toolbarpdf.com/docs/functions-and-features-of=inverters. html, Jan. 20, 2011, pp. 1-8.
Zhou, Jinghai, et al, Novel Sampling Algorithm for DSP Controlled 2kW PFC Converter, IEEE Transactions on Power Electronics, vol. 16, No. 2, Mar. 2001, pp. 1-6, Hangzhou, China.
Mammano, Bob, Current Sensing Solutions for Power Supply Designers, Texas Instruments, 2001, pp. 1-36, Dallas, Texas, USA.
Fairchild Semiconductor, Ballast Control IC FAN7532, Rev. 1.0.3, Jun. 2006, pp. 1-16, San Jose, California, USA.
Fairchild Semiconductor, Simple Ballast Controller, FAN7544, Rev. 1.0.0, Sep. 21, 2004, pp. 1-14, San Jose, California, USA.
Texas Instruments, High Performance Power Factor Preregulator, UC2855A/B and UC3855A/B, SLUS328B, Jun. 1998, Revised Oct. 2005, pp. 1-14, Dallas, TX, USA.
Balogh, Laszlo, et al, Power-Factor Correction with Interleaved Boost Converters in Continuous-Inductr-Current Mode, 1993, IEEE, pp. 168-174, Switzerland.
Cheng, Hung L., et al, A Novel Single-Stage High-Power-Factor Electronic Ballast with Symmetrical Topology, Power Electronics and Motion Control Conference, 2006. IPEMEC 2006. CES/IEEE 5th International, Aug. 14-16, 2006, vol. 50, No. 4, Aug. 2003, pp. 759-766, Nat. Ilan Univ., Taiwan.
Fairchild Semiconductor. Theory and Application of the ML4821 Average Current Mode PFC Controllerr, Fairchild Semiconductor Application Note 42030. Rev. 1.0, Oct. 25, 2000, pp. 1-19, San Jose, California, USA.
Garcia, 0., et al, High Efficiency PFC Converter to Meet EN610000302 and A14, Industrial Electronics, 2002. ISIE 2002. Proceedings of the 2002 IEEE International Symposium, vol. 3, pp. 975-980, Div. de Ingenieria Electronica, Univ. Politecnica de Madrid, Spain.
Infineon Technologies AG, Standalone Power Factor Correction (PFC) Controller in Continuous Conduction Mode (CCM), Infineon Power Management and Supply, CCM-PFC, ICE2PCS01, ICE2PCS01 G, Version 2.1, Feb. 6, 2007, p. 1-22, Munchen, Germany.
Lu, et al, Bridgeless PFC Implementation Using One Cycle Control Technique, International Rectifier, 2005, pp. 1-6, Blacksburg, VA, USA.
Brown, et al, PFC Converter Design with IR1150 One Cycle Control IC, International Rectifier, Application Note AN-1 077, pp. 1-18, El Segundo CA, USA.
International Rectifer, PFC One Cycle Control PFC IC, International Rectifier, Data Sheet No. PD60230 rev. C, IR1150(S)(PbF), IR11501(S)(PbF), Feb. 5, 2007, pp. 1-16, El Segundo, CA, USA.
International Rectifier, IRAC1150=300W Demo Board, User's Guide, Rev 3.0, International Rectifier Computing and Communications SBU—AC-DC Application Group, pp. 1-18, Aug. 2, 2005, El Segundo, CO USA.
Lai, Z., et al, A Family of Power-Factor-Correction Controller, Applied Power Electronics Conference and Exposition, 1997. APEC '97 Conference Proceedings 1997., Twelfth Annual, vol. 1, pp. 66-73, Feb. 23-27, 1997, Irvine, CA.

(56) References Cited

OTHER PUBLICATIONS

Lee, P, et al, Steady-State Analysis of an Interleaved Boost Converter with Coupled Inductors, IEEE Transactions on Industrial Electronics, vol. 47, No. 4, Aug. 2000, pp. 787-795, Hung Hom, Kowloon, Hong Kong.

Linear Technology, Single Switch PWM Controller with Auxiliary Boost Converter, Linear Technology Corporation, Data Sheet LT 1950, pp. 1-20, Milpitas, CA, USA.

Linear Technology, Power Factor Controller, Linear Technology Corporation, Data Sheet LT1248, pp. 1-12, Milpitas, CA, USA.

Supertex, Inc., HV9931 Unity Power Factor LED Lamp Driver, Supertex, Inc., Application Note AN-H52, 2007, pp. 1-20, Sunnyvale, CA, USA.

Ben-Yaakov, et al, The Dynamics of a PWM Boost Converter with Resistive Input, IEEE Transactions on Industrial Electronics, vol. 46., No. 3, Jun. 1999, pp. 1-8, Negev, Beer-Sheva, Israel.

Erickson, Robert W., et al, Fundamentals of Power Electronics, Second Edition, Chapter 6, 2001, pp. 131-184, Boulder CO, USA.

STMicroelectronics, CFL/TL Ballast Driver Preheat and Dimming L6574, Sep. 2003, pp. 1-10, Geneva, Switzerland.

Fairchild Semiconductor, 500W Power-Factor-Corrected (PFC) Converter Design with FAN4810, Application Note 6004, Rev. 1.0.1, Oct. 31, 2003, pp. 1-14, San Jose, CA, USA.

Fairfield Semiconductor, Power Factor Correction (PFC) Basics, Application Note 42047, Rev. 0.9.0, Aug. 19, 2004, pp. 1-11, San Jose, CA, USA.

Fairchild Semiconductor, Design of Power Factor Correction Circuit Using FAN7527B, Application Note AN4121, Rev. 1.0.1, May 30, 2002, pp. 1-12, San Jose, CA, USA.

Fairchild Semiconductor, Low Start-Up Current PFC/PWM Controller Combos FAN4800, Rev. 1.0.6, Nov. 2006, pp. 1-20, San Jose, CA, USA.

Prodic, Aleksander, Compensator Design and Stability Assessment for Fast Voltage Loops of Power Factor Correction Rectifiers, IEEE Transactions on Power Electronics, vol. 22, Issue 5, Sep. 2007, pp. 1719-1730, Toronto, Canada.

Fairchild Semiconductor, ZVS Average Current PFC Controller FAN 4822, Rev. 1.0.1, Aug. 10, 2001, pp. 1-10, San Jose, CA, USA.

* cited by examiner

COMPENSATING FOR A REVERSE RECOVERY TIME PERIOD OF A BIPOLAR JUNCTION TRANSISTOR (BJT) IN SWITCH-MODE OPERATION OF A LIGHT-EMITTING DIODE (LED)-BASED BULB

CROSS-REFERENCE TO RELATED APPLICATIONS

This application claims the benefit of priority of U.S. Provisional Patent Application No. 61/859,638 to Melanson et al. filed on Jul. 29, 2013 and entitled "Bipolar Junction Transistor (BJT) based efficient DC-DC conversion with accurate output current regulation," which is hereby incorporated by reference.

This application is related by subject matter to U.S. patent application Ser. No. 14/280,539 to John Melanson et al. filed May 16, 2014 and entitled "Charge Pump-Based Drive Circuitry for Bipolar Junction Transistor (BJT)-based Power Supply" and is related by subject matter to U.S. patent application Ser. No. 14/280,474 to Ramin Zanbaghi et al. filed May 16, 2014 and entitled "Single Pin Control of Bipolar Junction Transistor (BJT)-based Power Stage," and is related by subject matter to U.S. patent application Ser. No. 14/444,087 to Maru et al. filed Jul. 28, 2014, and entitled "Two-Terminal Drive of a Bipolar Junction Transistor (BJT) of a Light Emitting Diode (LED)-based Bulb," and is related by subject matter to U.S. patent application Ser. No. 13/715,914 to Siddharth Maru filed Dec. 14, 2012 and entitled "Multi-Mode Flyback Control For a Switching Power Converter," each of which is incorporated by reference.

FIELD OF THE DISCLOSURE

The instant disclosure relates to power supply circuitry. More specifically, this disclosure relates to power supply circuitry for lighting devices.

BACKGROUND

Alternative lighting devices to replace incandescent light bulbs differ from incandescent light bulbs in the manner that energy is converted to light. Incandescent light bulbs include a metal filament. When electricity is applied to the metal filament, the metal filament heats up and glows, radiating light into the surrounding area. The metal filament of conventional incandescent light bulbs generally has no specific power requirements. That is, any voltage and any current may be applied to the metal filament, because the metal filament is a passive device. Although the voltage and current need to be sufficient to heat the metal filament to a glowing state, any other characteristics of the delivered energy to the metal filament do not affect operation of the incandescent light bulb. Thus, conventional line voltages in most residences and commercial buildings are sufficient for operation of the incandescent bulb.

However, alternative lighting devices, such as compact fluorescent light (CFL) bulbs and light emitting diode (LED)-based bulbs, contain active elements that interact with the energy supply to the light bulb. These alternative devices are desirable for their reduced energy consumption, but the alternative devices have specific requirements for the energy delivered to the bulb. For example, compact fluorescent light (CFL) bulbs often have an electronic ballast designed to convert energy from a line voltage to a very high frequency for application to a gas contained in the CFL bulb, which excites the gas and causes the gas to glow. In another example, light emitting diode (LEDs)-based bulbs include a power stage designed to convert energy from a line voltage to a low voltage for application to a set of semiconductor devices, which excites electrons in the semiconductor devices and causes the semiconductor devices to glow. Thus, to operate either a CFL bulb or LED-based bulb, the line voltage must be converted to an appropriate input level for the lighting device of a CFL bulb or LED-based bulb. Conventionally, a power stage is placed between the lighting device and the line voltage to provide this conversion. Although a necessary component, this power stage increases the cost of the alternate lighting device relative to an incandescent bulb.

One conventional power stage configuration is the buck-boost power stage. FIG. 1 is a circuit schematic showing a buck-boost power stage for a light-emitting diode (LED)-based bulb. An input node 102 receives an input voltage, such as line voltage, for a circuit 100. The input voltage is applied across an inductor 104 under control of a switch 110 coupled to ground. When the switch 110 is activated, current flows from the input node 102 to the ground and charges the inductor 104. A diode 106 is coupled between the inductor 104 and light emitting diodes (LEDs) 108. When the switch 110 is deactivated, the inductor 104 discharges into the light emitting diodes (LEDs) 108 through the diode 106. The energy transferred to the light emitting diodes (LEDs) 108 from the inductor 104 is converted to light by LEDs 108.

The conventional power stage configuration of FIG. 1 provides limited control over the conversion of energy from a source line voltage to the lighting device. The only control available is through operation of the switch 110 by a controller. However, that controller would require a separate power supply or power stage circuit to receive a suitable voltage supply from the line voltage. Additionally, the switch 110 presents an additional expense to the light bulb containing the power stage. Because the switch 110 is coupled to the line voltage, which may be approximately 120-240 Volts RMS with large variations, the switch 110 must be a high voltage switch, which are large, difficult to incorporate into small bulbs, and expensive.

Shortcomings mentioned here are only representative and are included simply to highlight that a need exists for improved power stages, particularly for lighting devices and other consumer-level devices. Embodiments described here address certain shortcomings but not necessarily each and every one described here or known in the art.

SUMMARY

A bipolar junction transistor (BJT) may be used as a switch for controlling a power stage of a lighting device, such as a light-emitting diode (LED)-based light bulb. Bipolar junction transistors (BJTs) may be suitable for high voltage applications, such as for use in the power stage and for coupling to a line voltage. Further, bipolar junction transistors (BJTs) are lower cost devices than conventional high voltage field effect transistors (HV FETs). Thus, implementations of power stages having bipolar junction transistor (BJT) switches may be lower cost than power stage implementations having field effect transistor (FET) switches.

However, BJTs have some drawbacks to use in power stages. For example, the transition time to turn off the BJT is longer than HV FETs, leading to higher switching losses that increase proportional to an operational frequency of the BJT. Power BJTs for power stage applications in particular may have a low 0 leading to the base current for the BJT being a significant portion of power loss in the power stage. The longer transition time to turn off the BJT may also result in difficulty in providing a known average output current from the BJT. When the BJT does not turn off instantaneously, the average output current increases proportional to the turn-off time delay. This turn-off time must be predicted or measured to allow the use of BJTs in power stages, particularly for alternative lighting devices, to allow control over an average output current provided to the lighting devices.

In some embodiments, the turn-off transition time period, also referred to as a reverse recovery time period, may be compensated for by a controller coupled to the BJT. For example, a reverse recovery time period may be measured in one switching cycle and a subsequent switching cycle may include compensations to the switching on and switching off the BJT based on the measured reverse recovery time period. The process may repeat for multiple switching cycles to provide dynamic adjustment to compensate for the reverse recovery time period. When the reverse recovery time period is known, an error in the peak current obtained due to the reverse recovery time period may be calculated. The calculated error may be used to offset the target peak current for controlling the switching of the BJT to begin a turn-off transition of the BJT earlier in a switching cycle and thus reduce error in peak current at the BJT.

According to one embodiment, a method may include switching on a control signal to operate a bipolar junction transistor (BJT) for a first time period to charge an energy storage device; switching off the control signal to operate the bipolar junction transistor (BJT) for a second time period to discharge the energy storage device to a load; repeating the steps of switching on and the switching off the bipolar junction transistor to output a desired average current to the load; and/or dynamically adjusting the repeating of the switching on and the switching off to maintain the desired average current to the load by compensating for a reverse recovery time period of the bipolar junction transistor (BJT).

In some embodiments, the method may also include estimating an inductance value for the energy storage device, wherein the step of adjusting the duration of the first time period is based, at least in part, on the estimated inductance value; and/or providing a base current to a base of the bipolar junction transistor (BJT) during the first time period.

In certain embodiments, the step of dynamically adjusting the repeating comprises adjusting a duration of the first time period during the step of repeating to maintain the average current to the load by adjusting a reverse recovery time period of the bipolar junction transistor (BJT), wherein the reverse recovery time period occurs during the second time period; the step of dynamically adjusting the duration of the first time period may include measuring a reverse recovery time period during the steps of switching on the control signal and switching off the control signal; the step of dynamically adjusting the duration of the first time period may include determining a peak current compensation value from the measured reverse recovery time period; the step of dynamically adjusting the duration of the first time period may include adjusting the duration of the first time period to obtain the average output current based, at least in part, on the determined peak current compensation value; the step of dynamically adjusting may include predicting a peak current value through the energy storage device; the step of dynamically adjusting may include dynamically adjusting the repeating of the switching on and the switching off based, at least in part, on the predicted peak current value; the step of dynamically adjusting may include adapting a switching frequency based, at least in part, on the predicted peak current value; the step of dynamically adjusting may include controlling an output power of the bipolar junction transistor (BJT) based, at least in part, on the predicted peak current value; the step of controlling the output power may include holding the control signal off for a duration of an input voltage line cycle; the step of switching on the control signal may include switching on a switch coupled to an emitter of the bipolar junction transistor (BJT); the step of switching off the control signal may include switching off the switch; and/or the step of repeating the steps to output a desired average current to the load may include delivering power to a plurality of light emitting diodes (LEDs).

According to another embodiment, an apparatus may include a controller configured to couple to a base and an emitter of a bipolar junction transistor (BJT). The controller may be configured to perform the steps of: switching on a control signal to operate a bipolar junction transistor (BJT) for a first time period to charge an energy storage device; switching off the control signal to operate the bipolar junction transistor (BJT) for a second time period to discharge the energy storage device to a load; repeating the steps of switching on and switching off the bipolar junction transistor to output a desired average current to the load; and/or dynamically adjusting the repeating of the switching on and the switching off to maintain the desired average current to the load by compensating for a reverse recovery time period of the bipolar junction transistor (BJT).

In some embodiments, the controller may also be configured to measure a reverse recovery time period during the steps of switching on the control signal and switching off the control signal; determine a peak current compensation value from the measured reverse recovery time period; adjust the duration of the first time period to obtain the average output current based, at least in part, on the determined peak current compensation value; adjust a duration of the first time period during the step of repeating to maintain the average current to the load by adjusting a reverse recovery time period of the bipolar junction transistor (BJT); predict a peak current value through the energy storage device; dynamically adjust the repeating of the switching on and the switching off based, at least in part, on the predicted peak current value; adapt a switching frequency based, at least in part, on the predicted peak current value; control an output power of the bipolar junction transistor (BJT) based, at least in part, on the predicted peak current value; hold the control signal off for a duration of an input voltage line cycle; estimate an inductance value for the energy storage device; switch on a switch coupled to an emitter of the bipolar junction transistor (BJT); switch off the emitter-switch; provide a base current to a base of the bipolar junction transistor (BJT) during the first time period; and/or deliver power to a plurality of light emitting diodes (LEDs)

The foregoing has outlined rather broadly certain features and technical advantages of embodiments of the present invention in order that the detailed description that follows may be better understood. Additional features and advantages will be described hereinafter that form the subject of the claims of the invention. It should be appreciated by those having ordinary skill in the art that the conception and specific embodiment disclosed may be readily utilized as a basis for modifying or designing other structures for carrying out the same or similar purposes. It should also be realized by those having ordinary skill in the art that such equivalent constructions do not depart from the spirit and scope of the invention as set forth in the appended claims. Additional features will be better understood from the following description when considered in connection with the accompanying figures. It is to be expressly understood, however, that each of the figures is provided for the purpose of illustration and description only and is not intended to limit the present invention.

BRIEF DESCRIPTION OF THE DRAWINGS

For a more complete understanding of the disclosed system and methods, reference is now made to the following descriptions taken in conjunction with the accompanying drawings.

DETAILED DESCRIPTION

A bipolar junction transistor (BJT) may control delivery of power to a lighting device, such as light emitting diodes (LEDs). The bipolar junction transistor (BJT) may be coupled to a high voltage source, such as a line voltage, and may control delivery of power to the LEDs. The bipolar junction transistor (BJT) is a low cost device that may reduce the price of alternative light bulbs. In some embodiments, a controller coupled to the BJT may be configured to measure a reverse recovery time period of the BJT and adjust the switching of the BJT to compensate for the reverse recovery time period to maintain a desired average output current to a load.

Figure 1:
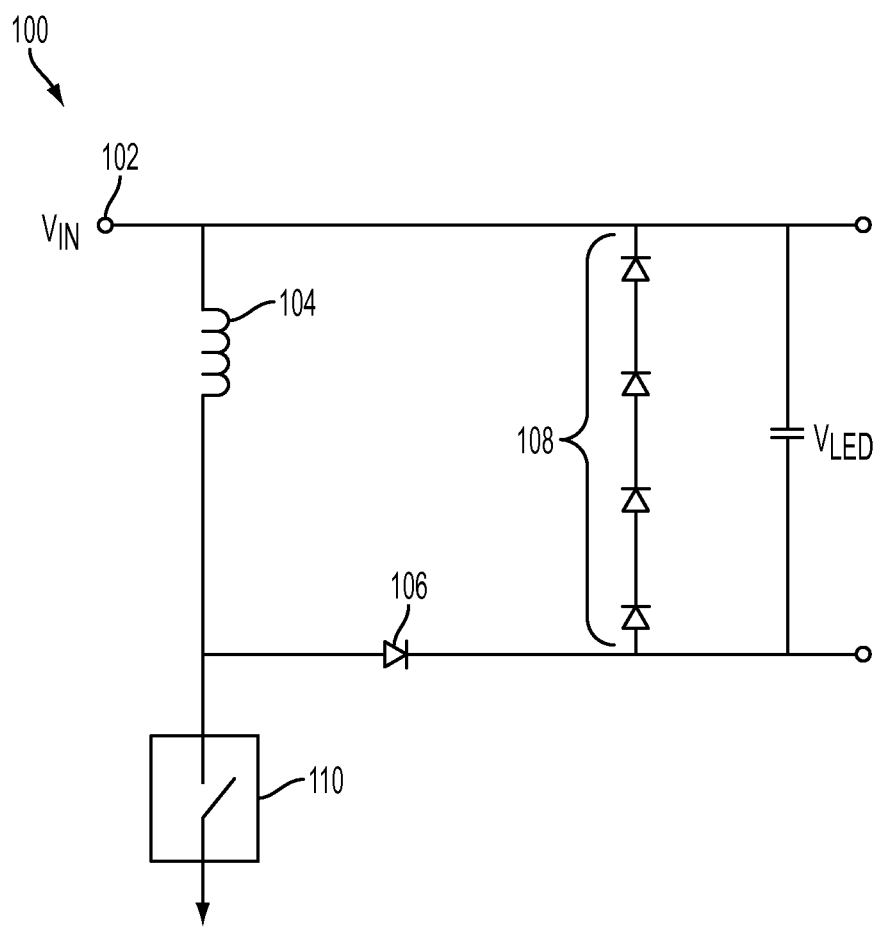
FIG. 1 is a circuit schematic illustrating a buck-boost power stage for a light-emitting diode (LED)-based bulb in accordance with the prior art.
Figure 2:
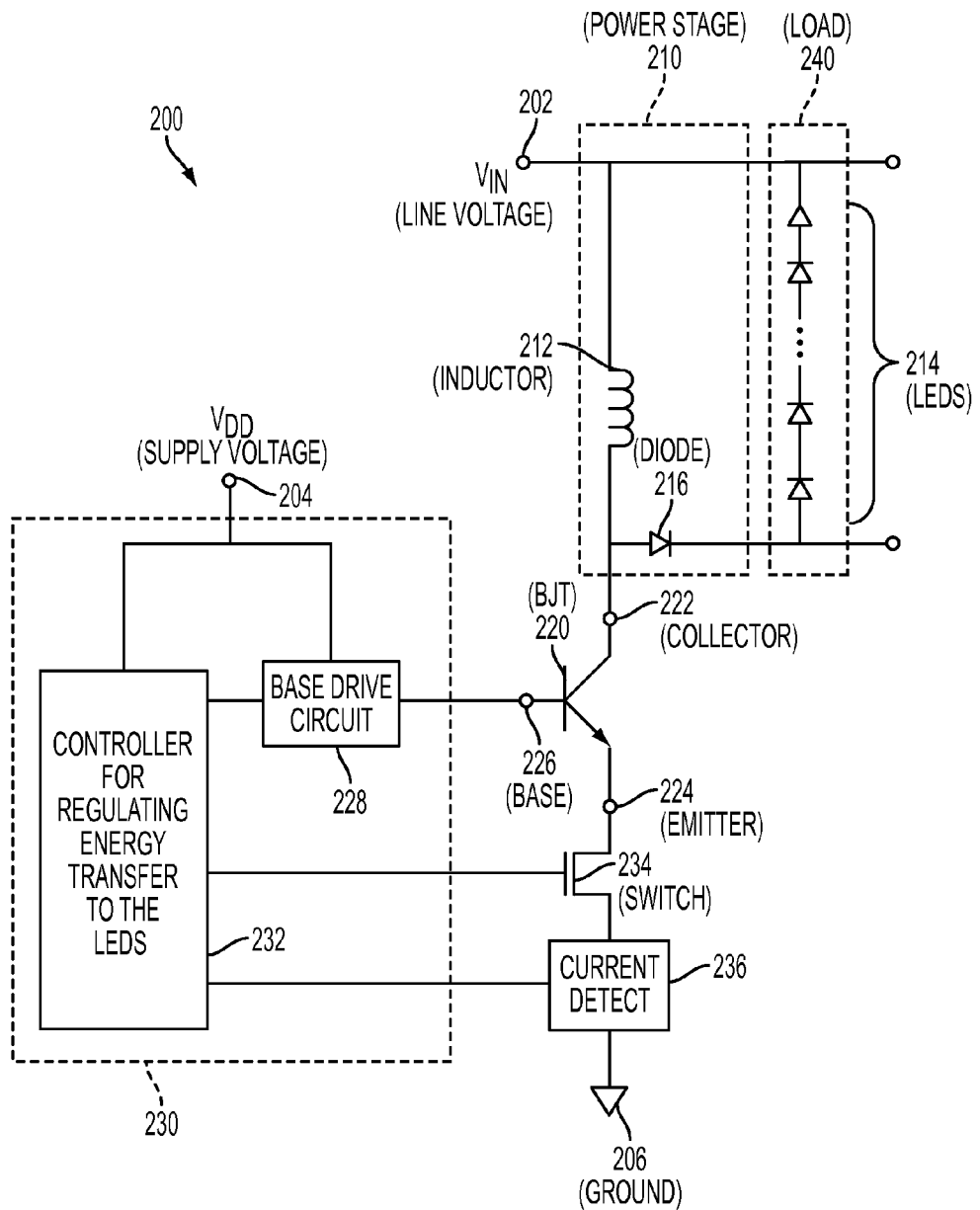
FIG. 2 is a circuit schematic illustrating a power stage having an emitter-controlled bipolar junction transistor (BJT) according to one embodiment of the disclosure.

A circuit for providing an output current to a load may include an emitter-controlled BJT for controlling delivery of power to the load. FIG. 2 is a circuit schematic illustrating a power stage having an emitter-controlled bipolar junction transistor (BJT) according to one embodiment of the disclosure. A circuit 200 may include a bipolar junction transistor (BJT) 220 having a collector node 222, an emitter node 224, and a base node 226. The collector 222 may be coupled to a high voltage input node 202 and a lighting load 214, such as a plurality of light emitting diodes (LEDs). An inductor 212 and a diode 216 may be coupled between the high voltage input node 202 and the lighting load 214. The inductor 212 and the diode 216 and other components (not shown) may be part of a power stage 210. The LEDs 214 may generically be any load 240.

Figure 3:
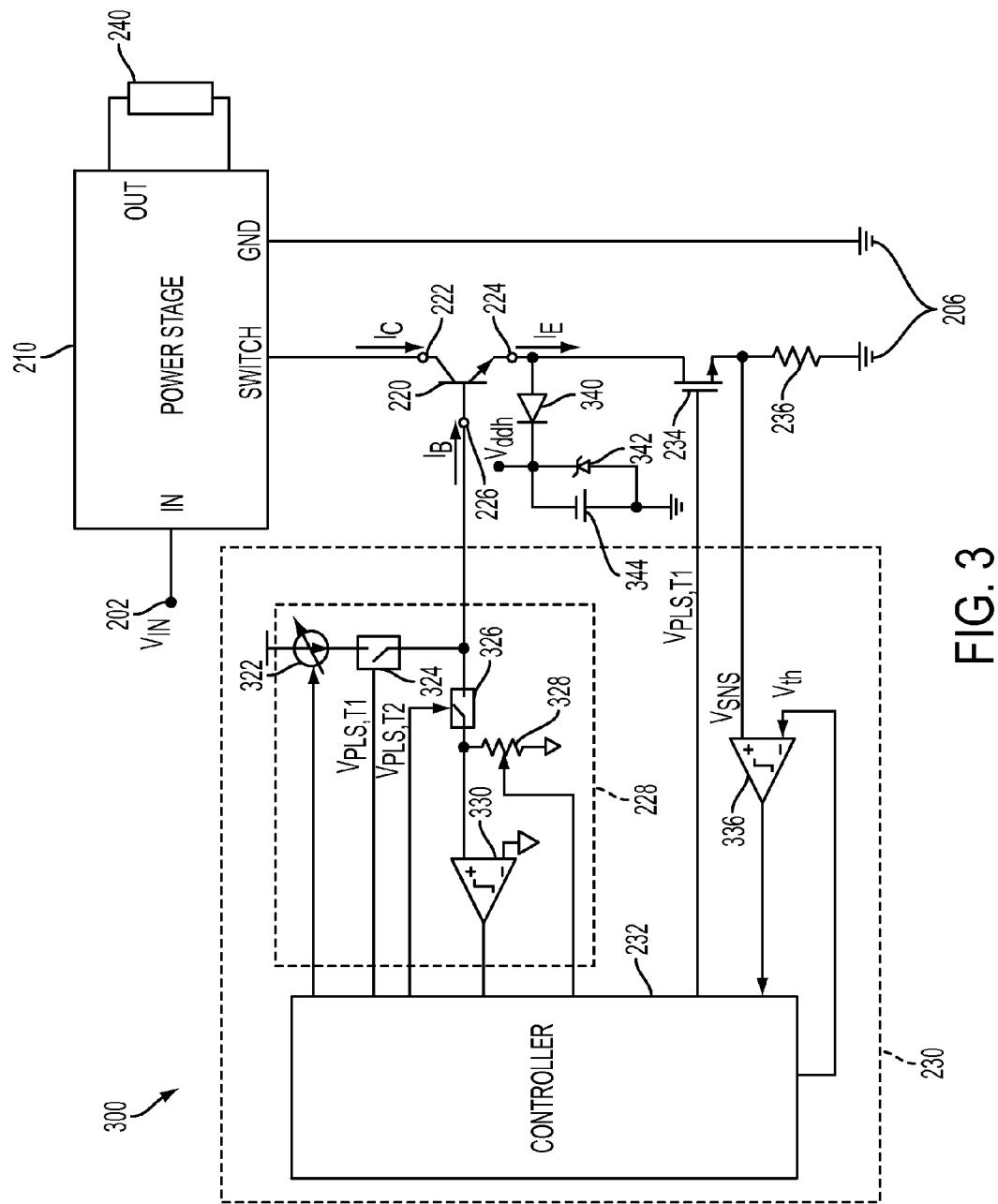
FIG. 3 is a circuit schematic illustrating control of a bipolar junction transistor (BJT) through two terminals according to one embodiment of the disclosure.

The emitter node 224 of the BJT 220 may be coupled to an integrated circuit (IC) 230 through a switch 234, and a current detect circuit 236. The switch 234 may be coupled in a current path from the emitter node 224 to a ground 206. The current detect circuit 236 may be coupled between the switch 234 and the ground 206. The controller 232 may control power transfer from the input node 202 to the lighting load 214 by operating the switch 234 to couple and/or disconnect the emitter node 224 of the BJT 220 to the ground 206. The current detect circuit 236 may provide feedback to the controller 232 regarding current flowing through the BJT 220 while the switch 234 is turned on to couple the emitter node 224 to the ground 206. As shown in FIG. 3, the switch 234 and the current detect circuit 236, such as the resistor 236 are not part of the IC 230. In another embodiment, the switch 234 and the resistor 236 may be part of the IC 230 and integrated with the controller 232 and other components shown in FIG. 3.

The base node 226 of the BJT 220 may also be coupled to the IC 230, such as through a base drive circuit 228. The base drive circuit 228 may be configured to provide a relatively fixed bias voltage to the base node 226 of the BJT 220, such as during a time period when the switch 234 is switched on. The base drive circuit 228 may also be configured to dynamically adjust base current to the BJT 220 under control of the controller 232. The base drive circuit 228 may be controlled to maintain conduction of the BJT 220 for a first time period. The base drive circuit 228 may be disconnected from the BJT 220 to begin a second flyback time period by turning off the BJT 220.

The controller 232 may control delivery of power to the lighting load 214 in part through the switch 234 at the emitter node 224 of the BJT 220. When the controller 232 turns on the switch 234, current flows from the high voltage input node 202, through the inductor 212, the BJT 220, and the switch 234, to the ground 206. During this time period, the inductor 212 charges from electromagnetic fields generated by the current flow. When the controller 232 turns off the switch 234, current flows from the inductor 212, through the diode 216, and through the lighting load 214 after a reverse recovery time period of the BJT 220 completes and a sufficient voltage accumulates at collector node 222 to forward bias diode 216 of the power stage 210. The lighting load 214 is thus powered from the energy stored in the inductor 212, which was stored during the first time period when the controller 232 turned on the switch 234. The controller 232 may repeat the process of turning on and off the switch 234 to control delivery of energy to the lighting load 214. Although the controller 232 operates switch 234 to start a conducting time period for the BJT 220 and to start a turn-off transition of the BJT 220, the controller 232 does not directly control conduction of the BJT 220. Control of delivery of energy from a high voltage source may be possible in the circuit 200 without exposing the IC 230 or the controller 232 to the high voltage source.

The controller 232 may adjust the first duration of time to hold the switch 234 on and the second duration of time to hold the switch 234 off based on feedback from the current detect circuit 236. For example, the controller 232 may turn off the switch 234 after the current detect circuit 236 detects current exceeding a first current threshold. A level of current detected by the current detect circuit 236 may provide the controller 232 with information regarding a charge level of the inductor 212. By selecting the first duration of the time and the second duration of time, the controller 232 may regulate an average current output to the LEDs 214.

Additional details for one configuration of the IC 230 are shown in FIG. 3. FIG. 3 is a circuit schematic illustrating control of a bipolar junction transistor (BJT) through two terminals according to one embodiment of the disclosure. A circuit 300 may include, within the IC 230, a forward base current source 322 coupled to the base node 226 by a forward base switch 324. The current source 322 may provide a variable base current adjustable by the controller 232. The switch 324 may be switched on by the controller 232 with a control signal $V_{PLS,T1}$. The control signal $V_{PLS,T1}$ may also be applied to the switch 234 at the emitter of the BJT 220. As described above, the switch 234 is turned on to charge the power stage 210 during a first time period. The switch 324 may also be turned on during the same time period, and current from the source 322 applied to the BJT 220 to allow the BJT 220 to remain turned on and in a conducting state. In one embodiment, the controller 232 may also control the current source 322 to increase a base current to the BJT 220 proportional to an increase in collector current through the BJT 220. The $V_{PLS,T1}$ control signal may be generated by monitoring a current detect resistor 236 with an amplifier 336. For example, when the current sensed by resistor 236 reaches a threshold voltage, $V_{th}$, the amplifier 336 output may switch states and the controller 232 may then switch a state of the $V_{PLS,T1}$ control signal.

The base current applied to the base node 226 by the current source 322 may be controlled by the controller 232. During a first time period, the controller 232 may modify an output of the current source 322 to maintain conduction of the BJT 220 and to control excess charge accumulated at the base node 226 of the BJT 220. After the forward base current source 322 is disconnected from the BJT 220, a second time period begins. A portion of this second time period is a reverse recovery time period during which base current flows from the BJT 220 until the BJT 220 turns off. The resistor 328 may allow monitoring of the reverse base current and thus detection of the end of the reverse recovery time period. In some embodiments, the resistor 328 may be a variable resistor to allow tuning of a reverse base current from the BJT 220. In some embodiments, the resistor 328 may also be coupled to the base node 222 with the switch 326 to reduce the likelihood of the base node 222 floating and causing a breakdown of the BJT 220.

Also during the reverse recovery time period, current from the emitter node 224 may be directed through a diode 340 to a Zener diode 342 and to charge a capacitor 344. The capacitor 344 may provide a supply voltage for the controller 232 outside of the reverse recovery time period. The BJT 220 then remains turned off until the forward base current source 322 is coupled to the base node 226. The period of the reverse recovery time period may be adjusted by the controller 232 by switching on and off the switch 326 and/or adjusting a resistance of the resistor 328. The switch 326 may be controlled through a control signal $V_{PLS,T2}$ generated by the controller 232. The control signal $V_{PLS,T2}$ may be generated by the controller 232 based, in part, on the output of a sense amplifier 330 coupled to the resistor 328. For example, the $V_{PLS,T2}$ signal may be switched to a high state when the $V_{PLS,T1}$ control signal switches to a low state. In some embodiments, the $V_{PLS,T2}$ signal may be switched to a low state after the sense amplifier 330 indicates the reverse current reaches zero. In other embodiments, the $V_{PLS,T2}$ signal may be switched to a low state after $V_{PLS,T1}$ is switched to a high state to maintain a ground 206 coupled to the base node 226.

Figure 4:
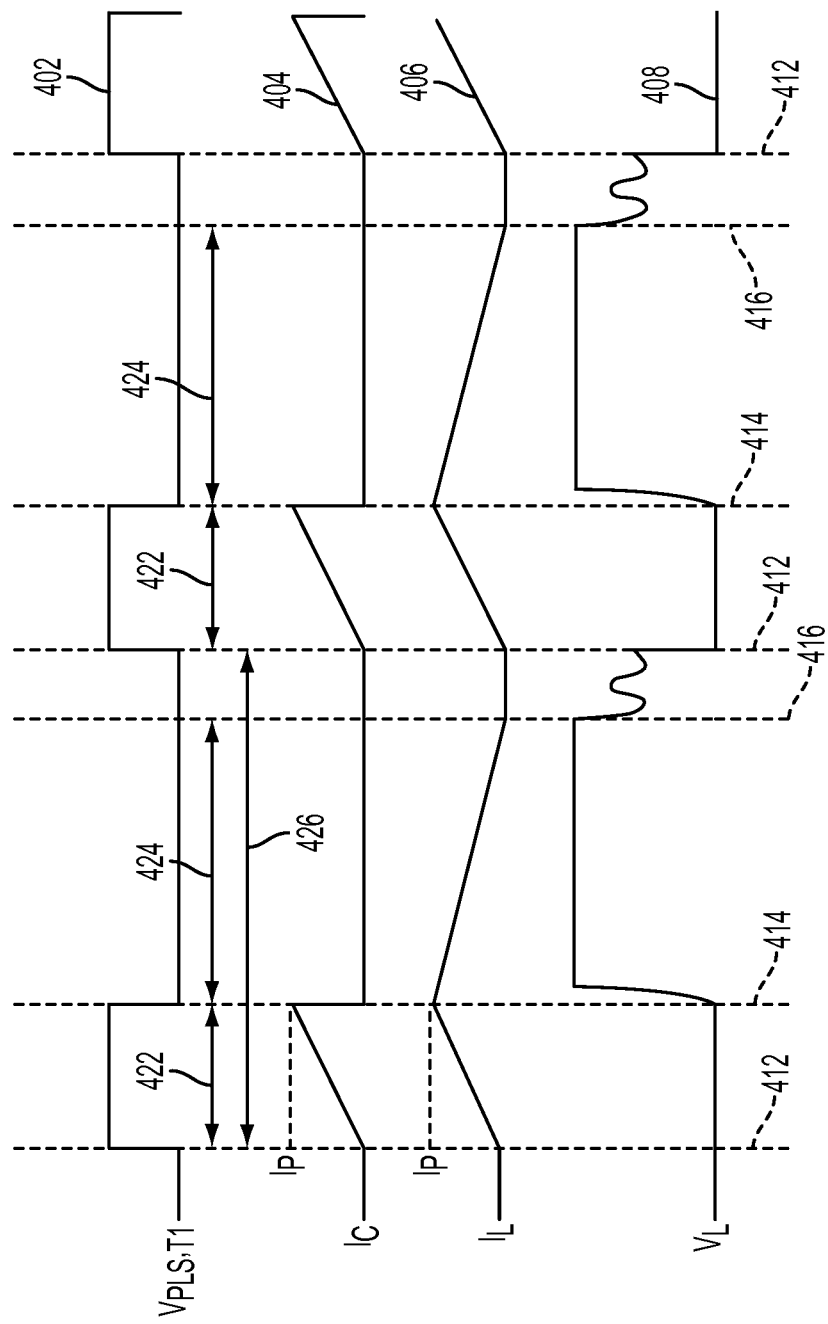
FIG. 4 are graphs illustrating operation of a switch-mode power stage operating with an ideal switch according to one embodiment of the disclosure.

Operation of the circuit 300 of FIG. 3 may be controlled by the controller 232 to adapt for non-ideal characteristics of the BJT 220 and/or other components of the circuit 300. Ideal operation of the switch-mode power supply of FIG. 3 is shown in FIG. 4. FIG. 4 are graphs illustrating operation of a switch-mode power stage operating with an ideal switch according to one embodiment of the disclosure. A line 402 illustrates a $V_{PLS,T1}$ control signal, the line 404 illustrates a collector current $I_C$, the line 406 illustrates an inductor 212 current $I_L$, and a line 408 illustrates an inductor 212 voltage $V_L$, which may also be the voltage at the collector node 222 of BJT 220.

A time period T1 422 is a period for which the $V_{PLS,T1}$ control signal is high. A time period T2B 424 is a time from the $V_{PLS,T1}$ control signal switching low to a time 416 that the inductor 212 of the power stage 210 is completely de-energized. During the T1 time period 422, the output diode 216 is reverse biased and no current flows through the load 240. Current flows through the load 240 during the T2B time period 424. The average output current (averaged over one switching period) may be calculated as:

$$I_{out} = \left(\frac{I_P}{2}\right) \times \left(\frac{T2B}{TT}\right).$$

Figure 5:
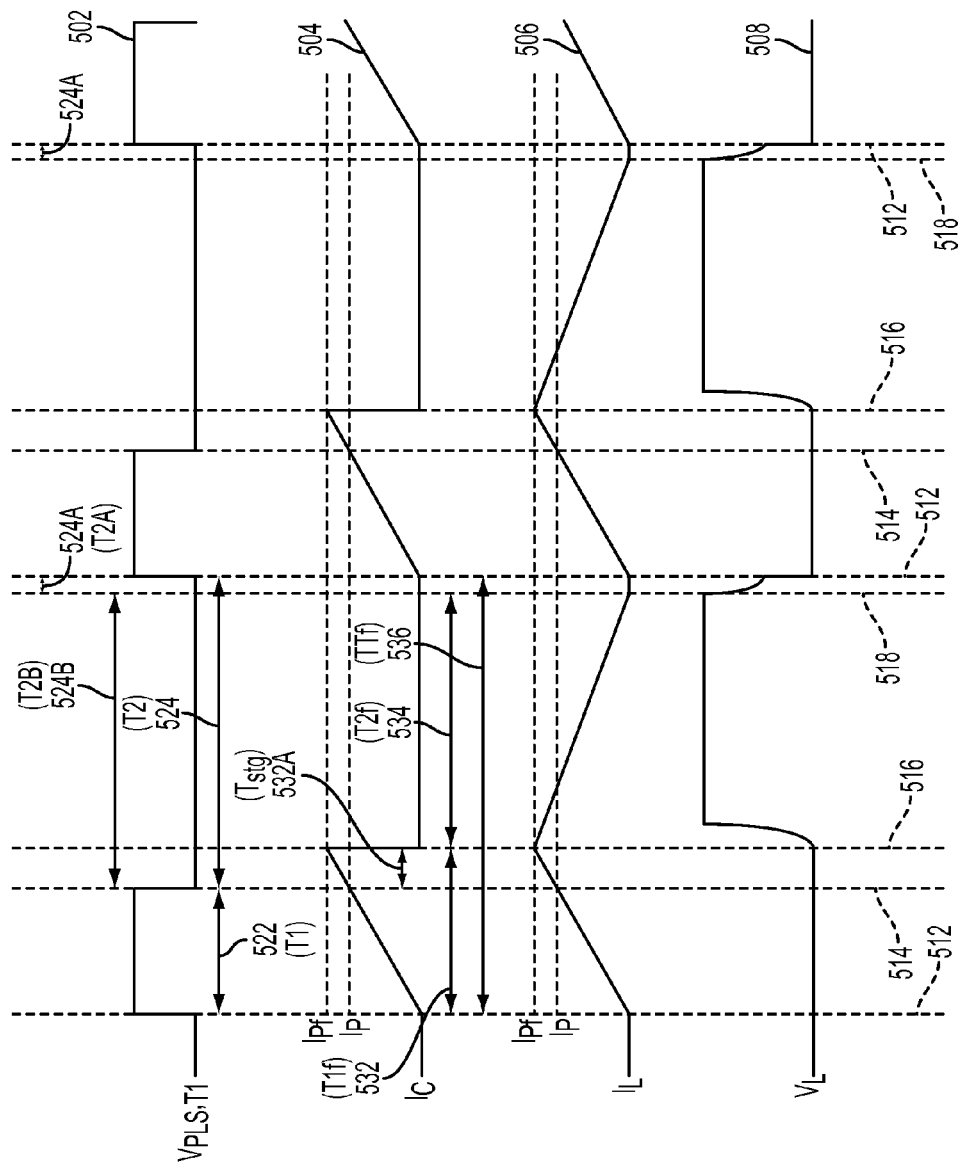
FIG. 5 are graphs illustrating operation of a switch-mode power stage operating with a transition turn-off time period according to one embodiment of the disclosure.

The waveforms of FIG. 4 are valid based on the assumption that the BJT 220 turns off immediately, without any delay. In implementation, the BJT 220 has a turn-off transition time and the waveforms for operation of the circuit 300 of FIG. 3 change. FIG. 5 shows waveforms for operation of the circuit 300 of FIG. 3 taking into account the turn-off transition time of the BJT 220.

FIG. 5 are graphs illustrating operation of a switch-mode power stage operating with a transition turn-off time period according to one embodiment of the disclosure. Some FETs approach a close approximation of an ideal switch as illustrated in FIG. 4. However, BJTs do not operate as described in FIG. 4 because of a longer transition turn-off time period. The operation of a switch-mode power supply with a transition turn-off time period, such as caused by a BJT, is shown in FIG. 5. A line 502 shows the $V_{PLS,T1}$ control signal for operating the switch 234, including a first time period T1 522 during which the switch 234 is turned on after time 512 and a second time period T2 524 during which the switch 234 is off after time 514. The second time period T2 524 may include a third time period T2A 524A beginning when the inductor 212 has de-energized at time 518. A line 504 shows the collector current $I_C$ of the BJT 220. The collector current $I_C$ continues to rise after time 514 through to time 516 because the BJT 220 has a transition turn-off time period $T_{stg}$ 532A. Thus, the BJT 220 is on for time period T1f 532, including the time period 522 the $V_{PLS,T1}$ control signal is high and the transition turn-off time period $T_{stg}$ 532A. The BJT 220 is then switched off and turned back on at the next time 512.

The actual peak current and the inductor de-energizing time in the waveforms of FIG. 5 are not current value $I_P$ and time period T2B 424 as in FIG. 4, but are current value $I_{Pf}$ and time period T2f 534 as shown in FIG. 5. The current value $I_{Pf}$ and time period T2f 534 values cannot be determined based on the turning on and turning off of the $V_{PLS,T1}$ control signal. While the signal $V_{PLS,T1}$ control signal switches low the moment the current through resistor 236 reaches current value $I_P$, the BJT 220 takes a finite time $T_{stg}$ 532A to turn off. This causes the inductor current $I_C$ to continue increasing to current value $I_{Pf}$ causing more energy to be transferred to the load 240. The average output current based on operation of a switch-mode power stage with BJT 220 may be calculated as:

$$I_{out_f} = \left(\frac{I_{Pf}}{2}\right) \times \left(\frac{T2_f}{TTf}\right),$$

where TTf is the switching cycle time, that is the duration of time from time 512 to the next time 512. The controller 232 may adjust the timing of the $V_{PLS,T1}$ control signal to obtain an actual output $I_{outf}$ that is approximately the same as the desired output current $I_{out}$. For example, the timing of time 512 and time 514 may be modified depending on the length of time of the turn-off transition time $T_{stg}$ 532A. Without a compensation, the error in the average output current to the load may be approximately:

$$I_{out_f} - I_{out} = ((I_{Pf} \times T2_f/(2 \times TTf)) - (I_P \times T2/(2 \times TT))).$$

A larger difference between current values $I_{Pf}$ and $I_P$ results from a larger transition turn-off time $T_{stg}$ 532A. In some embodiments, compensation may be applied by the controller 232 by adjusting the target peak current, a total switching period TTf 536, and/or the target charge to be pushed to the output depending on the output parameter being regulated. The input voltage $V_{IN}$ at input node 202 may vary over time, thus the compensation may be dynamically adjusted depending on a variation in the input voltage $V_{IN}$. A dynamic compensation scheme is discussed herein for a buck-boost converter implemented using BJT as a switching device. However, the dynamic compensation scheme may also be applied to any other power stage configuration, including boost, buck, buck-boost, and flyback configurations.

In one embodiment, control of power provided to the load 240 may be obtained by adjusting a switching cycle time period TT 536, by increasing or decreasing durations of time periods T1 522, T2 524, and/or T2A 526. In another embodiment, control of power provided to the load 240 may be obtained by switching off the BJT 220 for a remainder of a line cycle. That is, when the input voltage $V_{IN}$ is a line voltage source, the voltage may repeat cycles having a cycle time period. For example, for household AC power, the line voltage cycles at 60 Hz, with a line cycle time period of 1/60 of a second. The switching frequency of the BJT 220 may be higher than 60 Hz, such that the BJT 220 cycles on and off many times during the line cycle time period. After several switching cycles of the BJT 220, the BJT 220 may be controlled to remain off for the duration of the line cycle time period. The controller 232 may then begin switching on and off the BJT 220 at the start of the next line cycle time period.

Figure 6:
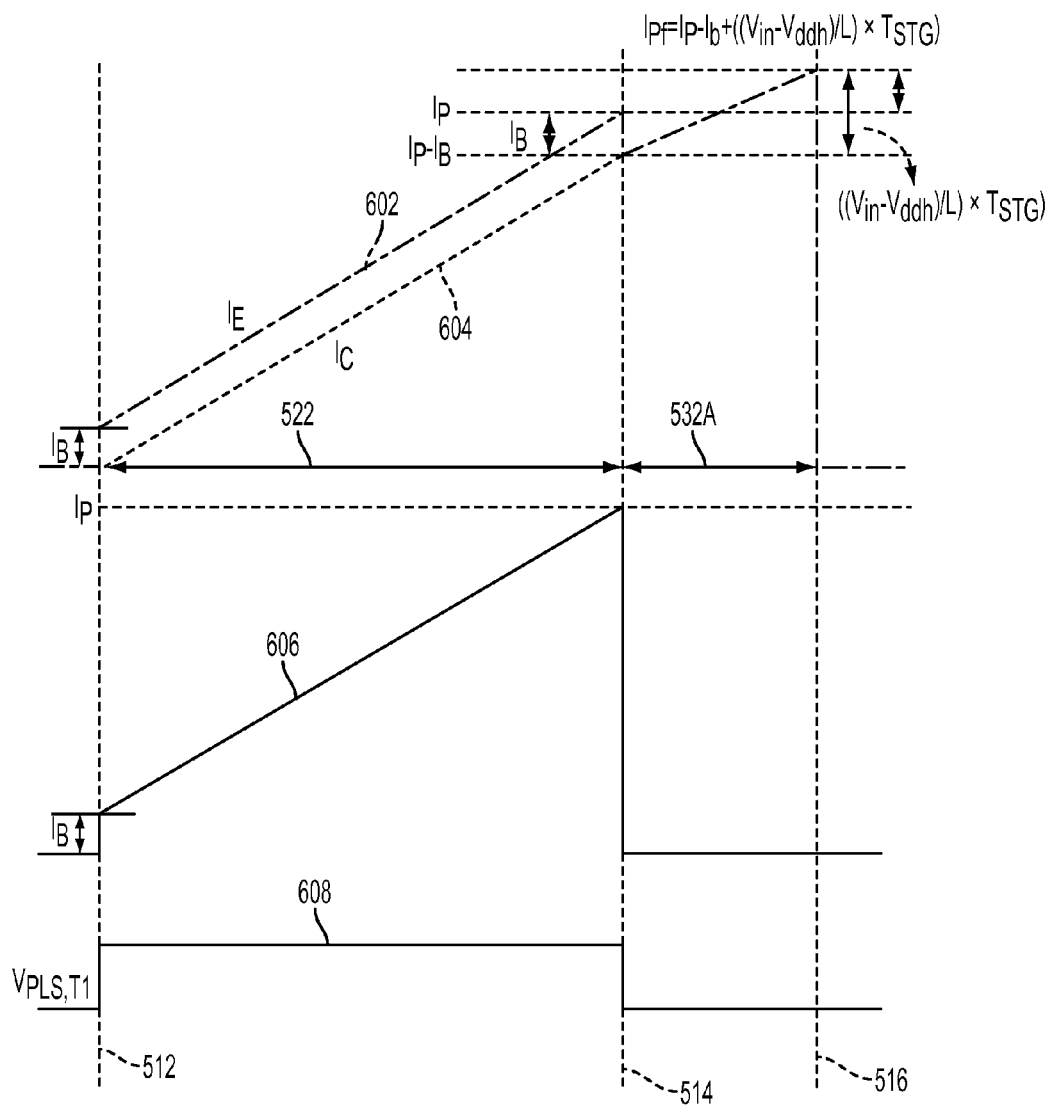
FIG. 6 are graphs illustrating operation of a switch-mode power stage with a bipolar junction transistor (BJT) according to one embodiment of the disclosure.

The amount of additional rise in the current through the inductor due to the turn-off delay of the BJT 220 may be calculated by the controller 232, such as by measuring sense current and collector current waveforms. Additional details regarding the calculation are illustrated with reference to FIG. 6. FIG. 6 are graphs illustrating operation of a switch-mode power stage with a bipolar junction transistor (BJT) according to one embodiment of the disclosure. A line 602 illustrates an emitter current $I_E$ at the emitter node 224, and a line 604 illustrates a collector current $I_C$ at the collector node 222. A line 606 illustrates a sense current $I_{SNS}$ through the resistor 236, and a line 608 illustrates the $V_{PLS,T1}$ control signal.

At time 512, the $V_{PLS,T1}$ signal switches to a high state to begin conduction through the BJT 220. During the T1 time period 522 when the BJT 220 is conducting, current flowing through the resistor 236 shown in line 606 may be approximately the sum of the collector current $I_C$ and the base current $I_B$ of the BJT 220. The sense current $I_{SNS}$ 606 reaches the target peak value $I_P$ earlier than the collector current $I_C$ 604. At time 514, when the $V_{PLS,T1}$ signal switches to a low state, the collector current $I_C$ has risen to a value of $I_P - I_B$, but the sense current $I_{SNS}$ is already $I_P$. Thus, the collector current $I_C$ rises from 0 to $I_P - I_B$ with a slope of $V_{IN}/L$, where L is an inductance of the inductor 212. After time 514, the emitter node 224 of the BJT 220 is no longer grounded but at approximately $V_{ddh}$. The collector current $I_C$ rises with a slope of approximately $(V_{IN} - V_{ddh})/L$ for the time period $T_{stg}$ 532A. The peak value reached by the collector current $I_C$ may be calculated as approximately:

$$I_P - I_B + \left(\frac{V_{in} - Vddh}{L}\right) \times T_{stg}.$$

The error compared to the desired peak current $I_P$ may then be calculated as:

$$\left(\frac{V_{in} - Vddh}{L}\right) \times T_{stg} - I_B.$$

$V_{IN}$ and $V_{ddh}$ may be measured by the controller 232 with, for example, an analog-digital converter (ADC), and $T_{stg}$ may be measured by observing the time for which the diode 340 conducts after the switch 234 is turned off. The base current $I_B$ may be controlled by the controller 232 and is thus a known quantity to the controller 232. In summary, an output current to the load 240 may be calculated for the various time periods as:

$$\begin{cases} i_L = \dfrac{V_{in}}{L} * t & (0 < t < T_1) BJT \text{ and } FET \text{ are on} \\ i_L = \dfrac{V_{in} - V_{ddh}}{L} * t & \begin{array}{l}(T_1 < t < T_1 + T_{stg}) BJT \text{ in Reverse Recovery and} \\ FET \text{ is off}\end{array} \\ i_L = \dfrac{-V_{LOAD}}{L} * t & \begin{array}{l}(T_1 + T_{stg} < t < T_1 + T_{stg} + T_{2f}) BJT \text{ and} \\ FET \text{ are off}\end{array} \end{cases}$$

where $V_{LOAD}$ is a voltage across the load 240. From this, an average output current $I_{O,AVG}$ to the load 240 may be calculated as:

$$I_{O,AVG} = \frac{I_{Pf} * T_{2f}}{2 * Tf} = \text{Constant},$$

where the actual peak current, $I_{Pf}$, may be calculated as:

$$I_{Pf} = I_P + \frac{(V_{in} - V_{ddh})}{L} * T_{stg} - I_B,$$

and the target peak current may be calculated as:

$$I_P = \frac{V_{in}}{L} * T_1$$

Thus, the amount of error $\delta I_P$ between the actual $I_{Pf}$ and target $I_P$ value of peak collector current $I_C$ may be calculated as $$\delta I_P = \left(\frac{V_{in} - Vddh}{L}\right) \times T_{stg} - I_B$$

In embodiments with a small value of $I_B$, such as for certain BJTs with a large value of current gain β, the base current $I_B$ may be ignored from the error equation without affecting the correction significantly.

Figure 7:
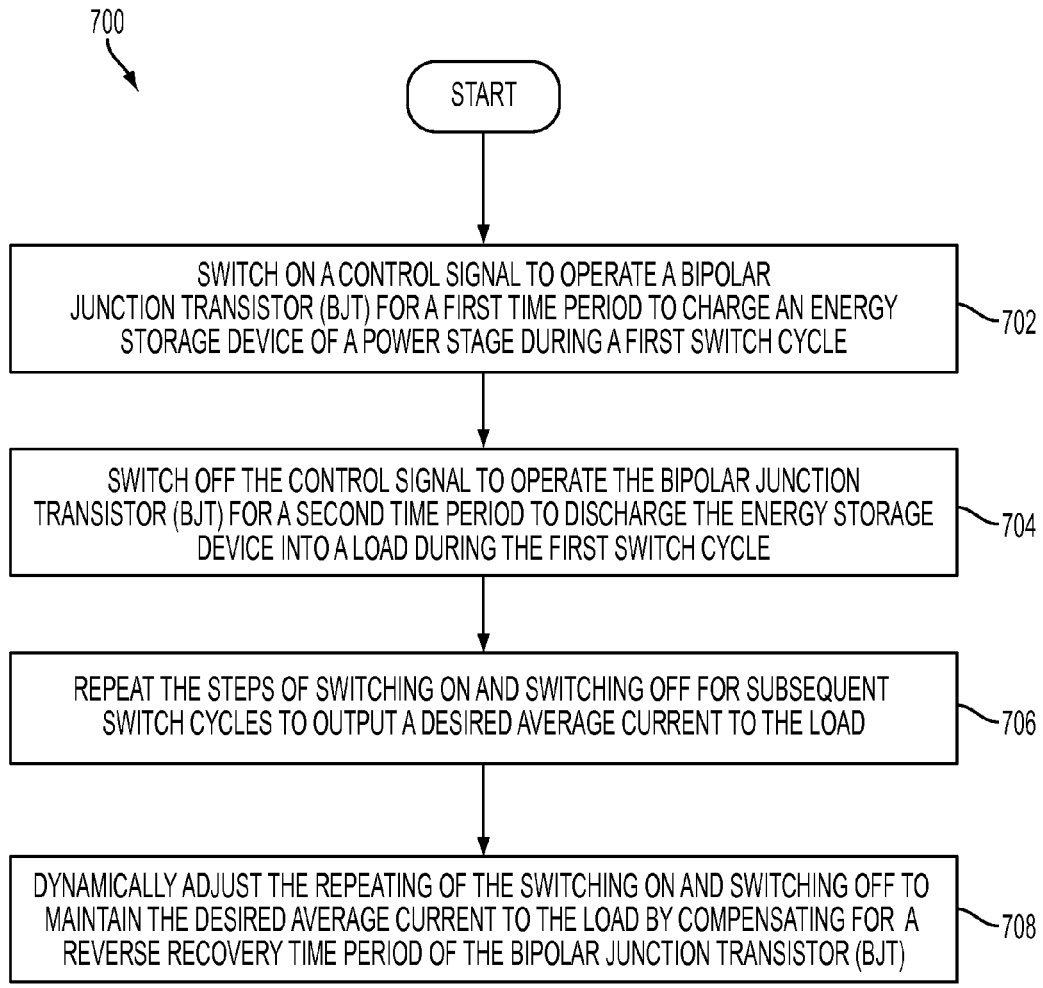
FIG. 7 is a flow chart illustrating a method of dynamically adjusting switching of a bipolar junction transistor (BJT) to compensate for reverse recovery according to one embodiment of the disclosure.

A method of compensating operation of a switch-mode power stage to compensate for the reverse recovery time period of the BJT is described in FIG. 7. FIG. 7 is a flow chart illustrating a method of dynamically adjusting switching of a bipolar junction transistor (BJT) to compensate for reverse recovery according to one embodiment of the disclosure. A method 700 may begin at block 702 with switching on a control signal to operate a bipolar junction transistor (BJT) in a first switch cycle. The control signal may be, for example, the $V_{PLS,T1}$ control signal of FIG. 3. The control signal may remain on for a first time period to charge an energy storage device, such as the inductor 212 of FIG. 2. At block 704, the control signal may be switched off to begin turning off the bipolar junction transistor (BJT) and begin a second time period that continues until the control signal is switched back on at the beginning of a subsequent second switch cycle. During an initial portion of the second time period, the BJT is transitioning to turn off during a reverse recovery time period. After the BJT completes the turn-off, the energy storage device may discharge into the load, such as the LEDs 214 of FIG. 2.

At block 706, the steps of blocks 702 and 704 may be repeated for subsequent switching cycles, such as a second switching cycle, and may continue repeating as long as the load is powered by the power stage 210. The ratio of time spent during the first time period of block 702 and the second time period of block 704 may define an average output current to the load. At block 708, the controller may adjust the repeating of blocks 702 and 704 to maintain a desired average current to the load by compensating for the reverse recovery time period of the BJT. As described above, an error in the target and obtained peak collector current of the BJT may be created by the reverse recovery time period of the BJT. The dynamic adjustment of the first and second time periods may be based on a determination of this error. In one embodiment, the dynamic adjustment may include pre-compensation of the error. In another embodiment, the dynamic adjustment may include post-compensation of the error.

Figure 8:
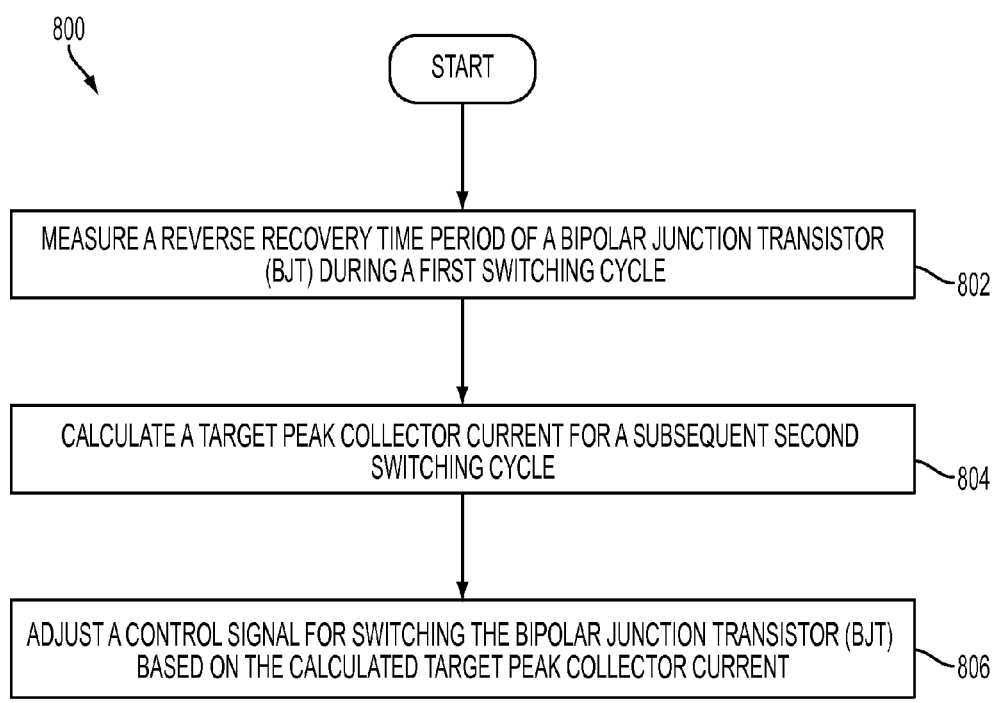
FIG. 8 is a flow chart illustrating a method of compensating for reverse recovery with pre-compensation according to one embodiment of the disclosure.

Dynamic adjustment using pre-compensation of error due to reverse recovery of the BJT is described with reference to FIG. 8. FIG. 8 is a flow chart illustrating a method of compensating for reverse recovery with pre-compensation according to one embodiment of the disclosure. A method 800 may begin at block 802 with measuring a reverse recovery time period of a BJT during a first switching cycle. At block 804, a target peak collector current for a subsequent second switching cycle may be calculated by the controller.

The calculated value of block 804 may be used at block 806 to adjust a control signal, such as the $V_{PLS,T1}$ signal, for switching the BJT to compensate for the measured reverse recovery time period of block 802. For example, when the reverse recovery time period $T_{stg}$ is known from the measurement at block 802, the error introduced by $T_{stg}$ may be calculated from:

$$\delta I_P = \left(\frac{V_{in} - Vddh}{L}\right) \times T_{stg} - I_B$$

The target peak collector current after compensation, $I_{Pc}$, may then be calculated from:

$$I_{Pc} = I_P - \delta I_P,$$

where $I_P$ is the desired peak current without compensation for the reverse recovery period and $\delta I_P$ is the calculated value from $T_{stg}$ described above.

Figure 9A:
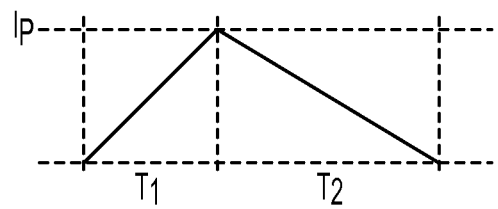
FIGS. 9A-C are graphs illustrating power stage inductor current for three different cases according to different embodiments of the disclosure.
Figure 9B:
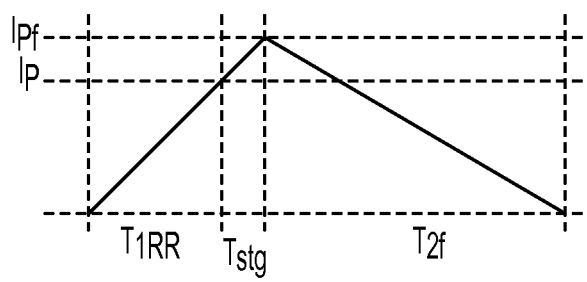
Figure 9C:
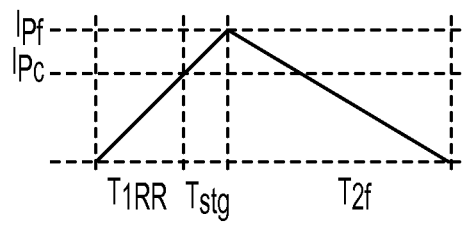

The compensation technique may be illustrated through reference to FIGS. 9A-C. FIGS. 9A-C are graphs illustrating power stage inductor current for three different cases according to different embodiments of the disclosure. FIG. 9A illustrates inductor current when there is no reverse recovery time, such that the inductor's target and actual peak current values are the same. FIG. 9B illustrates the case in which there is a greater than zero reverse recovery time period $T_{stg}$. In this case, the final inductor peak current value $I_{Pf}$ is higher than the target peak current value $I_P$, which results in an error in the delivered output power. The error may be calculated by comparing an output current calculated with no reverse recovery, $T_{O,AVG\_noRR}$, with an output current calculated with reverse recovery time but no compensation, $I_{O,AVG\_wRR\_woComp}$, which are calculated from:

$$I_{O,AVG\_noRR} = \frac{I_P * (T_{2f})}{2 * (T_1 + T_{2f} + T2A)},$$

and $$I_{O,AVG_{wRR_{woComp}}} = \frac{I_{Pf} * (T_{2f})}{2 * (T_{1RR} + T_{stg} + T_{2f})}.$$

When no correction is applied, it may be assumed that $T_{1RR} = T_1$, and thus the error in the average output current value may be calculated as:

$$\Delta I_{O,AVG_{error}} = I_{O,AVG_{wRR_{woComp}}} - I_{O,AVG_{noRR}}$$

$$= \frac{1}{2} \left\{ \frac{\left(I_P + \frac{(V_{in} - V_{ddh})}{L} * T_{stg} - I_B\right) * T_{2RR}}{T_{1RR} + T_{stg} + T_{2f}} - \frac{I_P * (T_{2f})}{T_1 + (T_{2f} + T2A)} \right\}$$

The computations described above apply to critical-conduction mode (CRM) of operation. Similar equations may be derived for discontinuous conduction mode (DCM) and continuous conduction mode (CCM).

To maintain a desired output current, the controller may dynamically adjust the switching of the BJT based, at least in part, on the reverse recovery time $T_{stg}$ and its effect on the inductor current $\delta I_P$, calculated as $$\delta I_P = \frac{(V_{in} - V_{ddh})}{L} * T_{stg} - I_B.$$

By lowering the target peak current value $I_P$ to a compensated peak value $I_{Pc}$, a final inductor peak current value $I_{Pf}$ matches the desired peak current value $I_P$ when the reverse recovery time period occurs. The effect of the compensation is shown in FIG. 9C. The target peak current value is set to $I_{Pc}$, which is lower than a desired peak current value $I_P$. Control signals may be generated to begin turning off the BJT when the compensated peak current $I_{Pc}$ value is exceeded by the collector current. Then, the BJT remains on for the reverse recovery time period $T_{stg}$, resulting in an actual peak current value $I_{Pf}$ of approximately the desired peak current value $I_P$. The target peak current is thus compensated by such an amount that the turn-off delay $T_{stg}$ causes the actual peak current $I_{Pf}$ to be approximately equal to the desired peak current $I_P$.

Figure 10A:
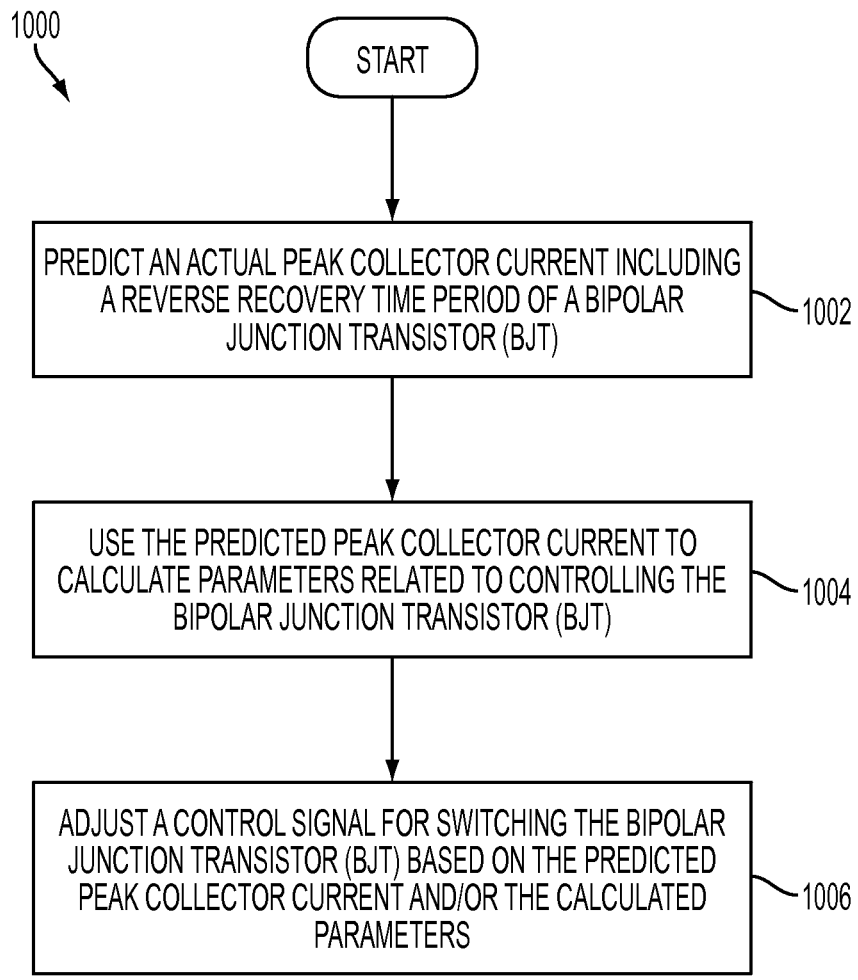
FIG. 10A is a flow chart illustrating a method of compensating for reverse recovery with post-compensation according to one embodiment of the disclosure.

Dynamic adjustment using post-compensation of error due to reverse recovery of the BJT is described with reference to FIGS. 10A-D. FIG. 10A is a flow chart illustrating a method of compensating for reverse recovery with post-compensation based on a predicted actual peak collector current according to one embodiment of the disclosure. A method 1000 may begin at block 1002 with predicting an actual peak collector current, wherein the predicted value includes an increase due to delay resulting from a reverse recovery time period of the BJT. At block 1004, the predicted peak collector current may be used to calculate parameters related to controlling the bipolar junction transistor, such as calculating a duration for turning on and off a switch coupled to the BJT. At block 1006, the control signal may be adjusted based on the predicted peak collector current of block 1002 and/or the calculated parameters of block 1004.

The method 1000, when executed by the controller 232, may cause the controller 232 to predict the actual peak current without compensation flowing through the inductor 212, instead of the desired current, and use this predicted value in calculations. In method 1000, the computed error in peak current may not be used to offset the target peak current for the next switching cycle. That is, the actual peak current may be calculated as $I_{Pf}=I_P+\delta I_P$ and used for all further calculations by the controller instead of $I_P$ to account for the additional increase in peak current. The method 1000 may provide a nearly constant average output current control when averaged, for example, over one half of a line cycle of the input voltage.

Figure 10B:
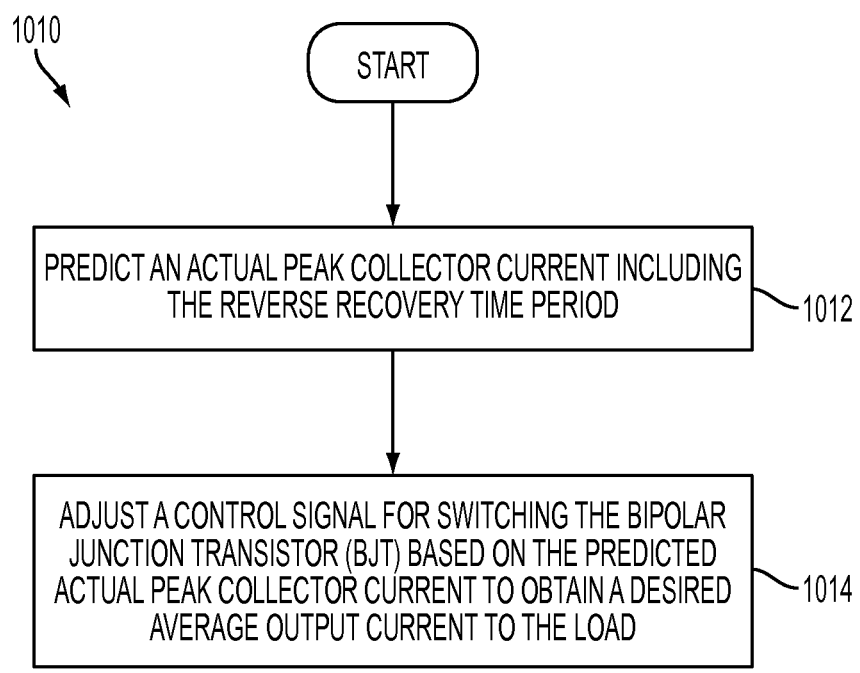
FIG. 10B is a flow chart illustrating a method of compensating for reverse recovery with post-compensation with switching frequency adjustment according to one embodiment of the disclosure.

Another method of post-compensation may include performing a switching frequency adjustment. FIG. 10B is a flow chart illustrating a method of compensating for reverse recovery with post-compensation with switching frequency adjustment according to one embodiment of the disclosure. A method 1010 begins at block 1012 with predicting an actual peak collector current including the reverse recovery time period. Then, at block 1014, a control signal for switching the BJT is adjusted based on the predicted value of block 1012 to obtain a desired average output current to the load. For example, the switching period TT may be increased or decreased by adjusting the control signal. For discontinuous conduction mode (DCM) operation, the output current may be calculated as $$I_{out} = I_{pk} * \left(\frac{T2B}{2*TT}\right).$$

If peak current $I_{pk}$ increases by a delta $\delta$ due to the reverse recovery time period of the BJT, then the method 1010 may proportionately increase the switching time period TT, which may cause an increase in the second time period T2B. One adjustment may be to increase the time duration TT by $(1+\delta)^2$ to obtain the desired average output current.

Figure 10C:
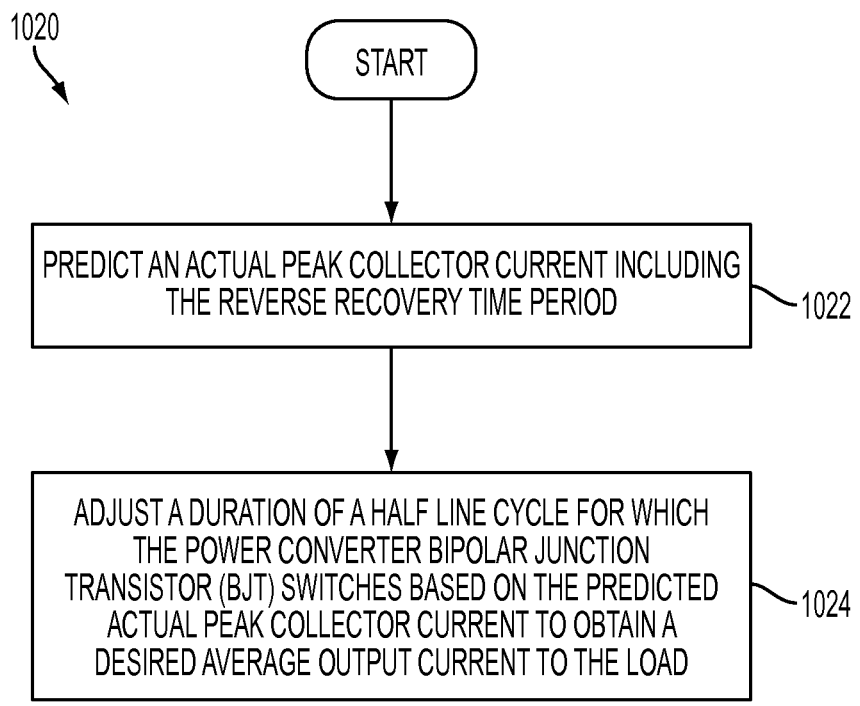
FIG. 10C is a flow chart illustrating a method of compensating for reverse recovery with post-compensation with switching duty cycle adjustment according to one embodiment of the disclosure.

Another method of post-compensation may include performing a switching duty cycle adjustment. FIG. 10C is a flow chart illustrating a method of compensating for reverse recovery with post-compensation with switching duty cycle adjustment according to one embodiment of the disclosure. A method 1020 may begin at block 1022 with predicting an actual peak collector current including the reverse recovery time period. Then, at block 1024, a duration of a half line cycle for which the power converter BJT switches may be adjusted through adjustment to a control signal for switching the BJT. To adjust the duration at block 1024 the control signal may be switched off for a portion of the half line cycle and the control signal toggled during the remainder of the half line cycle.

The adjustment at block 1024 is illustrated in the following example. A FET-based power converter switches 100 times to push a desired charge in a given half line cycle. Those 100 switches may occupy 7 ms out of a possible 8.33 ms half line cycle. Due to the delay in a BJT-based power converter, more charge is pushed per cycle. Thus, only 80 switches may be necessary to push the same amount of charge. Thus, the control signal may only be toggled for 80% of the 7 ms half-line cycle. Then, the control signal may be turned off until the next half-line cycle.

This adjustment may be based on the predicted value of block 1022. When the controller 232 is configured to maintain the desired average output current over a half line cycle, the total charge pushed to the load may be adjusted by modifying the control signals for switching the BJT. In one embodiment, the duty cycle may be modified for the half line cycle such that the BJT is not switched back on until the next half line cycle after a target charge has been pushed to the load. The actual pushed charge to the load may be calculated from the delta $\delta$ as $$Q_{pushed}=[I_{pk}(1+\delta)][T2B(1+\delta)].$$

Figure 10D:
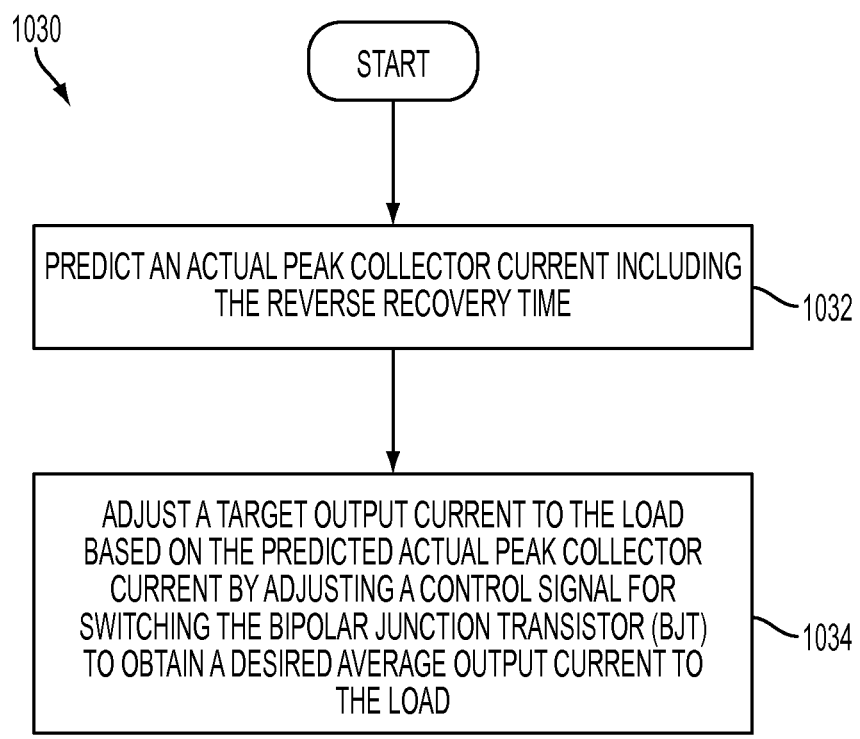
FIG. 10D is a flow chart illustrating a method of compensating for reverse recovery with post-compensation with a changing output target according to one embodiment of the disclosure.

Another method of post-compensation may include a changing output target. FIG. 10D is a flow chart illustrating a method of compensating for reverse recovery with post-compensation with a changing output target according to one embodiment of the disclosure. A method 1030 may begin at block 1032 with predicting an actual peak collector current including the reverse recovery time period. Then, at block 1034, a target output current to the load may be adjusted based on the predicted value of block 1032 by adjusting a control signal for switching the BJT to obtain the desired average output current to the load. For example, the output current may be modified by a scaling factor, k, within the controller 232 when calculating parameters for generating control signals for switching the BJT. The output current with scaling factor may be calculated as:

$$I_{out,scaled} = I_{out} * k * (1-\delta).$$

The scaled output current value described above in the controller 232 may cause the controller 232 to modify the next target peak current value and reduce an output current to compensate for the reverse recovery time period of the BJT.

Some formulas described above relating to compensating switching of the BJT for a reverse recovery time period of the BJT rely on information regarding an inductance of the energy storage device, such as the inductor 212, in the power stage. The inductance value may be hard-coded into the controller or the inductance value may be estimated by the controller. An estimate of the inductance may be estimated to within a scaling factor from the equation:

$$L = T1 \times \frac{V_{in}}{I_P - I_B}.$$

For any value of $I_P$, the switch 234 may turn off when the inductor current has risen to a value of $I_P - I_B$ or when the current through resistor 236 has risen to $I_P$. After the switch 234 turns off, the T1 time may be measured and the input voltage value $V_{IN}$ obtained from an analog-to-digital converter (ADC) (not shown) to compute the value of L using the formula listed above. Other methods of estimating or measuring an inductance value may be implemented by the controller 232, such as those described in U.S. Pat. No. 8,179,110, which is hereby incorporated by reference. Additionally, the value of L may be measured or estimated approximately every few seconds, or more or less frequently, to reduce the impact of inductance variation on the estimated peak current.

Figure 11:
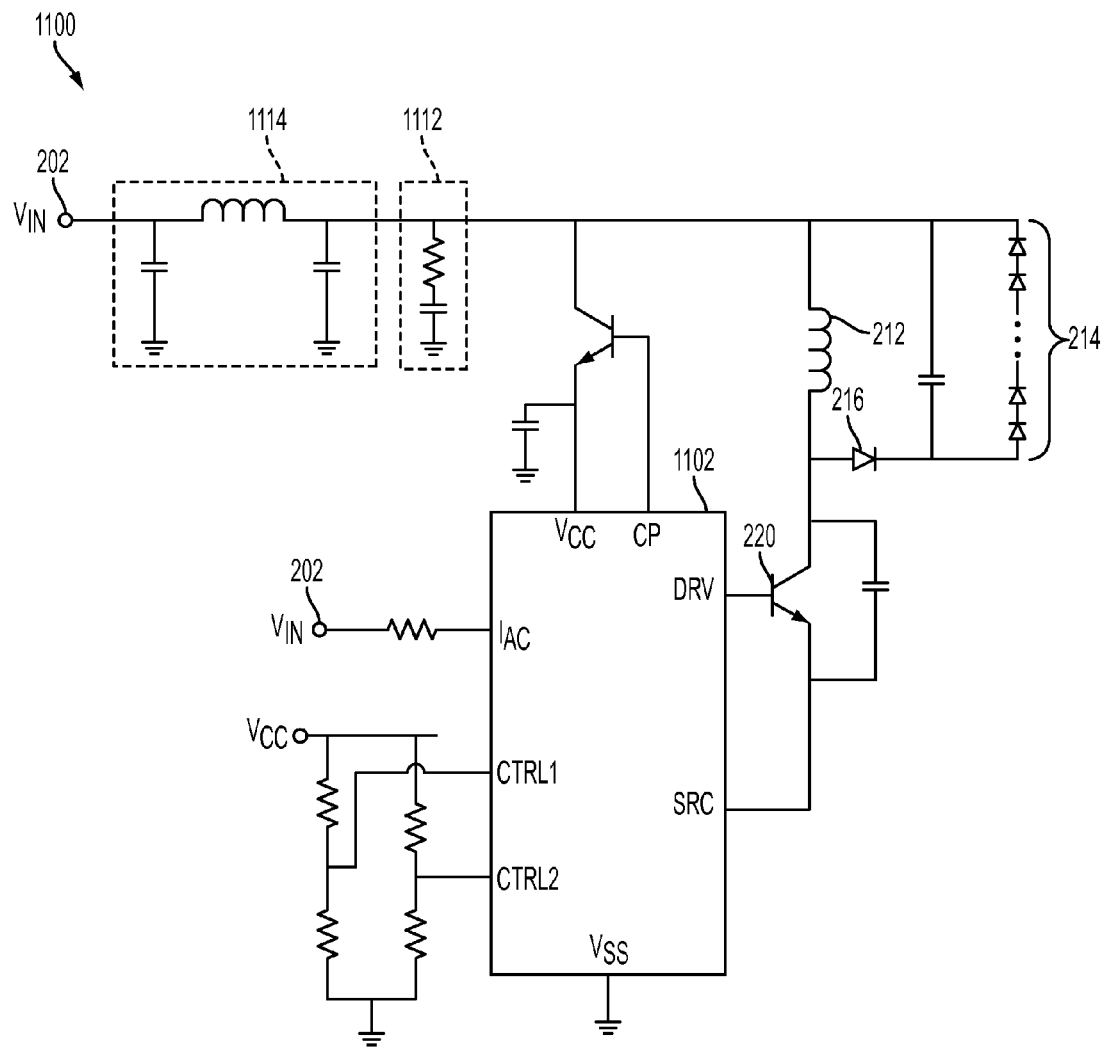
FIG. 11 is a circuit schematic of a DC-DC converter with a control integrated circuit (IC) for regulating the DC-to-DC conversion according to one embodiment.

The various circuits and controllers configured to perform the methods described above may be packaged into an integrated circuit (IC) for use as part of a DC-DC converter circuit. One example DC-DC converter circuit is illustrated in FIG. 11. FIG. 11 is a circuit schematic of a DC-DC converter with a control integrated circuit (IC) for regulating the DC-to-DC conversion according to one embodiment. The circuit 1100 may include a controller 1102 coupled to the bipolar junction transistor (BJT) 220 for regulating energy transfer of energy to a load, such as LEDs 214. Although LEDs 214 are illustrated as a load for power consumption throughout this description, any load may be coupled to the circuit 1100 to receive regulated energy for consumption. In some embodiments, an electromagnetic interference (EMI) prevention circuit 1114 may be coupled between the line voltage $V_{IN}$ input node 202 and the controller 1102. The $V_{IN}$ input node 202 may receive a rectified alternating current (AC) input signal for operating the circuit 1100. In some embodiments, a snubber circuit 1112 may be coupled between the $V_{IN}$ node 202 and the controller 1102. The controller 1102 may output signals through a drive (DRV) output to a base of the BJT 220 and a source (SRC) output to an emitter of the BJT 220. Other inputs may be provided to the controller 1102 for controlling the controller 1102 from an external component through the CTRL1 and CTRL2 inputs. Further, the controller 1102 may be configured with an input to sense current at the $V_{IN}$ 202 node. The controller 1102 may include certain circuits described above for controlling operation of the BJT 220, such as by dynamically adjusting a reverse recovery time period of the BJT 220 and maintaining an average current output to the LEDs 214.

Figure 12:
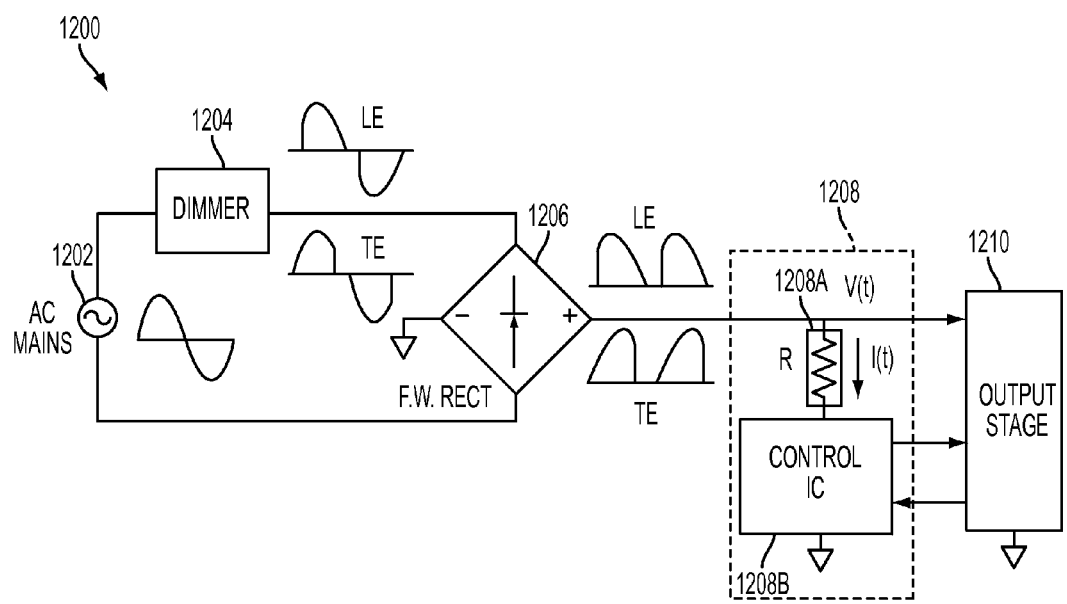
FIG. 12 is a block diagram illustrating a dimmer system for a light-emitting diode (LED)-based bulb with two terminal drive of a bipolar junction transistor (BJT)-based power stage according to one embodiment of the disclosure.

The circuits described above, including the control IC 1102 of FIG. 11, described above may be integrated into a dimmer circuit to provide dimmer compatibility, such as with lighting devices. FIG. 12 is a block diagram illustrating a dimmer system for a light-emitting diode (LED)-based bulb with two terminal drive of a bipolar junction transistor (BJT)-based power stage according to one embodiment of the disclosure. A system 1200 may include a dimmer compatibility circuit 1208 with a variable resistance device 1208A and a control integrated circuit (IC) 1208B. The dimmer compatibility circuit 1208 may couple an input stage having a dimmer 1204 and a rectifier 1206 with an output stage 1210, which may include light emitting diodes (LEDs). The system 1200 may receive input from an AC mains line 1202. The output stage 1210 may include a power stage based on a bipolar junction transistor (BJT) as described above. For example, the output stage 1210 may include an emitter-switched bipolar junction transistor (BJT) in the configurations of FIG. 2 and FIG. 3.

If implemented in firmware and/or software, the functions described above, such as with respect to FIG. 7, FIG. 8, and/or FIG. 10 may be stored as one or more instructions or code on a computer-readable medium. Examples include non-transitory computer-readable media encoded with a data structure and computer-readable media encoded with a computer program. Computer-readable media includes physical computer storage media. A storage medium may be any available medium that can be accessed by a computer. By way of example, and not limitation, such computer-readable media can comprise random access memory (RAM), read-only memory (ROM), electrically erasable programmable read-only memory (EEPROM), compact-disc read-only memory (CD-ROM) or other optical disk storage, magnetic disk storage or other magnetic storage devices, or any other medium that can be used to store desired program code in the form of instructions or data structures and that can be accessed by a computer. Disk and disc includes compact discs (CD), laser discs, optical discs, digital versatile discs (DVD), floppy disks and blu-ray discs. Generally, disks reproduce data magnetically, and discs reproduce data optically. Combinations of the above should also be included within the scope of computer-readable media.

In addition to storage on computer readable medium, instructions and/or data may be provided as signals on transmission media included in a communication apparatus. For example, a communication apparatus may include a transceiver having signals indicative of instructions and data. The instructions and data are configured to cause one or more processors to implement the functions outlined in the claims.

Although the present disclosure and certain representative advantages have been described in detail, it should be understood that various changes, substitutions and alterations can be made herein without departing from the spirit and scope of the disclosure as defined by the appended claims. For example, although signals generated by a controller are described throughout as "high" or "low," the signals may be inverted such that "low" signals turn on a switch and "high" signals turn off a switch. Moreover, the scope of the present application is not intended to be limited to the particular embodiments of the process, machine, manufacture, composition of matter, means, methods and steps described in the specification. As one of ordinary skill in the art will readily appreciate from the present disclosure, processes, machines, manufacture, compositions of matter, means, methods, or steps, presently existing or later to be developed that perform substantially the same function or achieve substantially the same result as the corresponding embodiments described herein may be utilized. Accordingly, the appended claims are intended to include within their scope such processes, machines, manufacture, compositions of matter, means, methods, or steps.

What is claimed is:

1. A method comprising:
   switching on a control signal to operate a bipolar junction transistor (BJT) for a first time period to charge an energy storage device;
   switching off the control signal to operate the bipolar junction transistor (BJT) for a second time period to discharge the energy storage device to a load;
   repeating the steps of switching on and switching off the bipolar junction transistor (BJT) to output a desired average current to the load; and
   dynamically adjusting the repeating of the switching on and the switching off to maintain the desired average current to the load by compensating for a reverse recovery time period of the bipolar junction transistor (BJT).

2. The method of claim 1, wherein the step of dynamically adjusting the repeating comprises adjusting a duration of the first time period during the step of repeating to maintain the desired average current to the load by adjusting a reverse recovery time period of the bipolar junction transistor (BJT), wherein the reverse recovery time period occurs during the second time period.

3. The method of claim 2, wherein the step of dynamically adjusting the duration of the first time period comprises:
   measuring a reverse recovery time period during the steps of switching on the control signal and switching off the control signal;
   determining a peak current compensation value from the measured reverse recovery time period; and
   adjusting the duration of the first time period to obtain the desired average current based, at least in part, on the determined peak current compensation value.

4. The method of claim 1, wherein the step of dynamically adjusting comprises:
   predicting a peak current value through the energy storage device; and
   dynamically adjusting the repeating of the switching on and the switching off based, at least in part, on the predicted peak current value.

5. The method of claim 4, wherein the step of dynamically adjusting comprises adapting a switching frequency based, at least in part, on the predicted peak current value.

6. The method of claim 4, wherein the step of dynamically adjusting comprises controlling an output power of the bipolar junction transistor (BJT) based, at least in part, on the predicted peak current value.

7. The method of claim 6, wherein the step of controlling the output power comprises holding the control signal off for a duration of an input voltage line cycle.

8. The method of claim 1, further comprising estimating an inductance value for the energy storage device, wherein the step of adjusting the duration of the first time period is based, at least in part, on the estimated inductance value.

9. The method of claim 1, wherein the step of switching on the control signal comprises switching on a switch coupled to an emitter of the bipolar junction transistor (BJT), and wherein the step of switching off the control signal comprises switching off the switch.

10. The method of claim 9, further comprising providing a base current to a base of the bipolar junction transistor (BJT) during the first time period.

11. The method of claim 1, wherein the step of repeating the steps to output a desired average current to the load comprises delivering power to a plurality of light emitting diodes (LEDs).

12. An apparatus, comprising:
    a controller configured to couple to a base and an emitter of a bipolar junction transistor (BJT),
    wherein the controller is configured to perform the steps comprising:
       switching on a control signal to operate the bipolar junction transistor (BJT) for a first time period to charge an energy storage device;
       switching off the control signal to operate the bipolar junction transistor (BJT) for a second time period to discharge the energy storage device to a load;
       repeating the steps of switching on and switching off the bipolar junction transistor (BJT) to output a desired average current to the load; and
       dynamically adjusting the repeating of the switching on and the switching off to maintain the desired average current to the load by compensating for a reverse recovery time period of the bipolar junction transistor (BJT).

13. The apparatus of claim 12, wherein the step of dynamically adjusting the repeating comprises adjusting a duration of the first time period during the step of repeating to maintain the desired average current to the load by adjusting a reverse recovery time period of the bipolar junction transistor (BJT), wherein the reverse recovery time period occurs during the second time period.

14. The apparatus of claim 13, wherein the step of dynamically adjusting the duration of the first time period comprises:
    measuring a reverse recovery time period during the steps of switching on the control signal and switching off the control signal;
    determining a peak current compensation value from the measured reverse recovery time period; and
    adjusting the duration of the first time period to obtain the desired average current based, at least in part, on the determined peak current compensation value.

15. The apparatus of claim 12, wherein the step of dynamically adjusting comprises:
    predicting a peak current value through the energy storage device; and
    dynamically adjusting the repeating of the switching on and the switching off based, at least in part, on the predicted peak current value.

16. The apparatus of claim 15, wherein the step of dynamically adjusting comprises adapting a switching frequency based, at least in part, on the predicted peak current value.

17. The apparatus of claim 15, wherein the step of dynamically adjusting comprises controlling an output power of the bipolar junction transistor (BJT) based, at least in part, on the predicted peak current value.

18. The apparatus of claim 17, wherein the step of controlling the output power comprises holding the control signal off for a duration of an input voltage line cycle.

19. The apparatus of claim 12, wherein the controller is further configured to perform the step of estimating an inductance value for the energy storage device, wherein the step of adjusting the duration of the first time period is based, at least in part, on the estimated inductance value.

20. The apparatus of claim 12, wherein switching on the control signal comprises switching on a switch coupled to an emitter of the bipolar junction transistor (BJT), and wherein switching off the control signal comprises switching off the switch.

21. The apparatus of claim 20, wherein the controller is further configured to perform the step of providing a base current to a base of the bipolar junction transistor (BJT) during the first time period.

22. The apparatus of claim 12, wherein the step of repeating the steps to output the desired average current to the load comprises delivering power to a plurality of light emitting diodes (LEDs).

* * * * *